(12) United States Patent
Kao et al.

(10) Patent No.: US 10,405,000 B2
(45) Date of Patent: Sep. 3, 2019

(54) ONE-DIMENSIONAL TRANSFORM MODES AND COEFFICIENT SCAN ORDER

(71) Applicant: Vid Scale, Inc., Wilmington, DE (US)

(72) Inventors: Jiun-Yu Kao, Los Angeles, CA (US); Maryam Azimi Hashemi, San Diego, CA (US); Xiaoyu Xiu, San Diego, CA (US); Yuwen He, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 86 days.

(21) Appl. No.: 15/528,497

(22) PCT Filed: Nov. 23, 2015

(86) PCT No.: PCT/US2015/062173
§ 371 (c)(1),
(2) Date: May 19, 2017

(87) PCT Pub. No.: WO2016/081939
PCT Pub. Date: May 26, 2016

(65) Prior Publication Data
US 2017/0280163 A1 Sep. 28, 2017

Related U.S. Application Data

(60) Provisional application No. 62/082,991, filed on Nov. 21, 2014.

(51) Int. Cl.
*H04N 19/60* (2014.01)
*H04N 19/61* (2014.01)
(Continued)

(52) U.S. Cl.
CPC ........... *H04N 19/61* (2014.11); *H04N 19/122* (2014.11); *H04N 19/129* (2014.11);
(Continued)

(58) Field of Classification Search
CPC .. H04N 19/122; H04N 19/129; H04N 19/157; H04N 19/176; H04N 19/593; H04N 19/60; H04N 19/61; H04N 19/70
See application file for complete search history.

(56) References Cited

U.S. PATENT DOCUMENTS

| | | | | |
|---|---|---|---|---|
| 6,330,665 B1 * | 12/2001 | Wise | ...................... | G06F 9/3867 712/300 |
| 2003/0130574 A1 * | 7/2003 | Stoyle | ...................... | G06T 5/003 600/410 |

(Continued)

FOREIGN PATENT DOCUMENTS

GB        2492333 A        1/2013

OTHER PUBLICATIONS

An et al., "Residue Scan for Intra Transform Skip Mode", MediaTek Inc., Document: JCTVC-J0053, Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, pp. 1-5.

(Continued)

*Primary Examiner* — Anner N Holder
(74) *Attorney, Agent, or Firm* — Condo Roccia Koptiw LLP

(57) ABSTRACT

Methods and apparatus are provided for performing one-dimensional (1D) transform and coefficient scanning. An encoder may apply 1D transform in either a horizontal or a vertical direction. The encoder may then determine a coefficient scan order based on the 1D transform direction. The scan order may be determined to be in a direction orthogonal to the 1D transform direction. The encoder may further flip the coefficients prior to scanning. The flipping may also be in a direction orthogonal to the 1D transform direction. A decoder may receive indications from the encoder with respect to the 1D transform, coefficient scanning, and/or (Continued)

coefficient flipping. The decoder may perform functions inverse to those performed by the encoder based on the indications.

16 Claims, 17 Drawing Sheets

(51) Int. Cl.
    *H04N 19/70*     (2014.01)
    *H04N 19/122*     (2014.01)
    *H04N 19/129*     (2014.01)
    *H04N 19/157*     (2014.01)
    *H04N 19/176*     (2014.01)
    *H04N 19/593*     (2014.01)

(52) U.S. Cl.
    CPC ......... *H04N 19/157* (2014.11); *H04N 19/176* (2014.11); *H04N 19/593* (2014.11); *H04N 19/60* (2014.11); *H04N 19/70* (2014.11)

(56) References Cited

U.S. PATENT DOCUMENTS

| | | | |
|---|---|---|---|
| 2006/0153467 A1* | 7/2006 | Staelin | G06T 5/10 382/250 |
| 2008/0198936 A1* | 8/2008 | Srinivasan | H04N 19/70 375/240.26 |
| 2010/0272374 A1* | 10/2010 | Ballaplle | H04N 19/129 382/250 |
| 2010/0290520 A1* | 11/2010 | Kamisli | H04N 19/176 375/240.2 |
| 2011/0286525 A1* | 11/2011 | Kamisli | H04N 19/176 375/240.16 |
| 2012/0099646 A1* | 4/2012 | Coban | H04N 19/176 375/240.12 |
| 2014/0016698 A1* | 1/2014 | Joshi | H04N 19/88 375/240.12 |
| 2014/0376611 A1* | 12/2014 | Kim | H04N 19/176 375/240.02 |
| 2015/0078432 A1* | 3/2015 | Wang | H04N 19/159 375/240.02 |
| 2015/0078445 A1* | 3/2015 | Wang | H04N 19/61 375/240.12 |
| 2015/0341641 A1* | 11/2015 | Kolesnikov | H04N 19/176 375/240.02 |
| 2017/0094314 A1* | 3/2017 | Zhao | H04N 19/61 |
| 2017/0238020 A1* | 8/2017 | Karczewicz | H04N 19/117 375/240.29 |
| 2018/0204313 A1* | 7/2018 | Mahmood | G06F 17/142 |

OTHER PUBLICATIONS

Bross et al., "WD5: Working Draft 5 of High-Efficiency Video Coding", Document: Jctvc-G1103, Joint Collaborative Team on Video Coding (Jct-Vc) of Itu-T SG16 WP3 and Iso/Iec JTC1/SC29/WG11, 7th Meeting: Geneva, CH, Nov. 21-30, 2011, 213 pages.

ITU-T, "Advanced Video Coding for Generic Audiovisual Services", Series H: Audiovisual and Multimedia Systems, Infrastructure of audiovisual services—Coding of moving video; International Telecommunication Union (ITU), H.264, Nov. 2007, 564 pages.

McCann et al., "HM5: High Efficiency Video Coding (HEVC) Test Model 5 Encoder Description", Document: JCTVC-G1102, WG11 Number: N12345, Joint Collaborative Team on Video Coding (JCT-VC) of ITU-T SG16 WP3 and ISO/IEC JTC1/SC29/WG11, 7th Meeting: Geneva, CH, Nov. 21-30, 2011, 57 pages.

MRAK et al., "Transform Skip Mode", British Broadcasting Corporation, Document: JCTVC-F077_r1, Joint Collaborative Team on Video Coding (JCT-VC) of ITU-T SG 16 WP3 and ISO/IEC JTC1/SC29/WG 11, 6th Meeting: Torino, IT, Jul. 14-22, 2011, pp. 1-9.

MRAK et al., "Transform Skip Mode", Document: JCTVC-G575, British Broadcasting Corporation, Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-13.

SMPTE, "VC-1 Compressed Video Bitstream Format and Decoding Process", SMPTE 421M-2006, Feb. 24, 2006, 493 pages.

Sole et al., "Transform Coefficient Coding in HEVC", IEEE Transactions on Circuits and Systems for Video Technology, vol. 22, No. 12, Dec. 2012, pp. 1765-1777.

Sullivan et al., "Rate-Distortion Optimization for Video Compression", Signal Processing Magazine, IEEE, vol. 15, Issue 6, Nov. 1998, pp. 74-90.

Tourapis et al., "H.264/14496-10 AVC Reference Software Manual", JVT-AE010, JM Reference Software JM16.1, Dolby Laboratories Inc., Fraunhofer-Institute Hill, Microsoft Corporation, Document Available at: http://iphome.hhi.de/suehring/tml/download/old_jm/jm16.1.zip, 2009, 90 pages.

Zhao et al., "Improved Intra Transform Skip Mode in HEVC", IEEE International Conference on Image Processing, Sep. 15, 2013, pp. 2010-2014.

\* cited by examiner

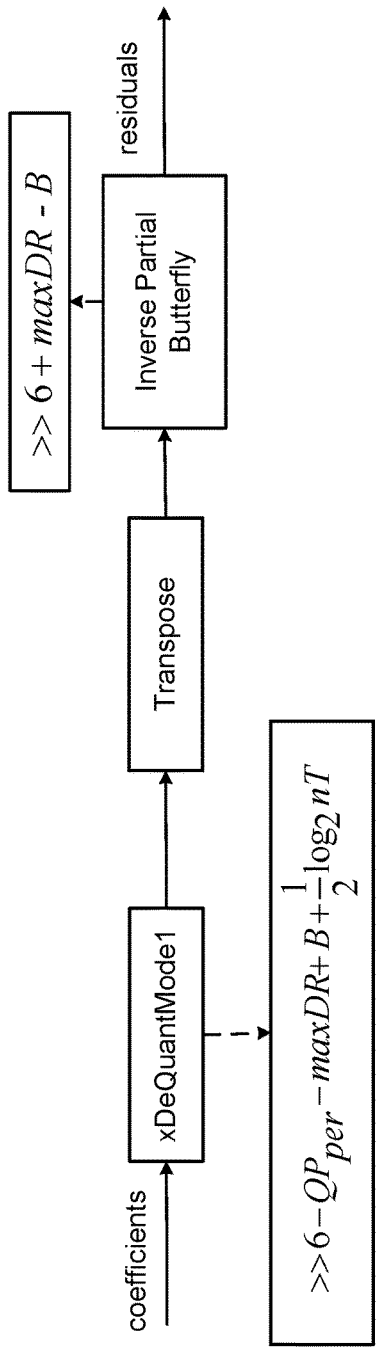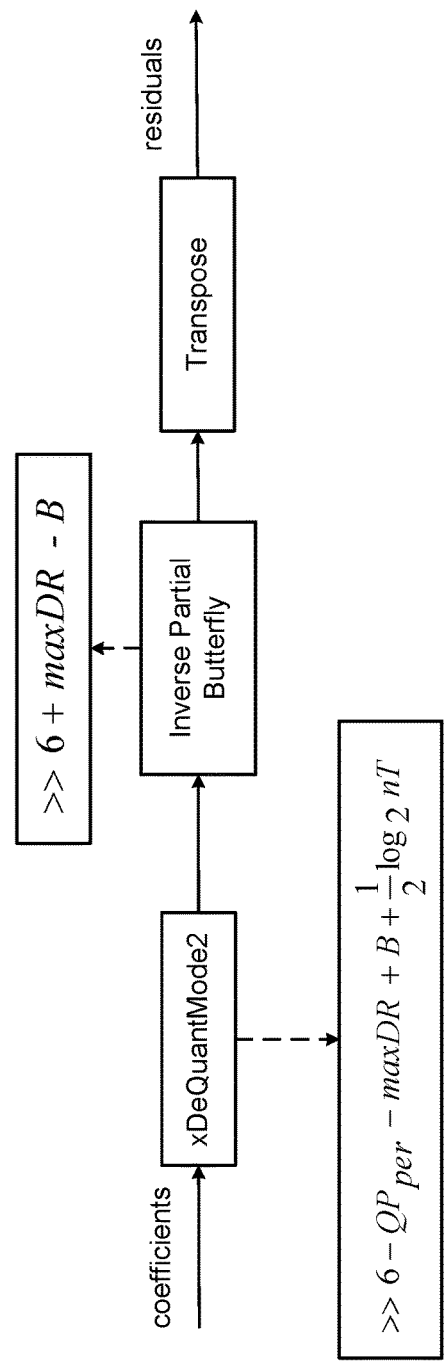
FIG. 4A
FIG. 4B

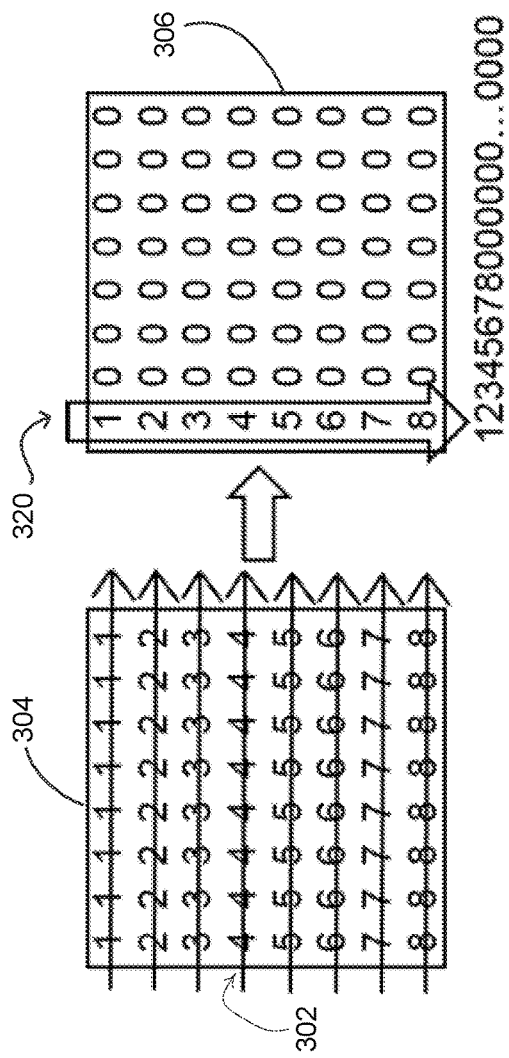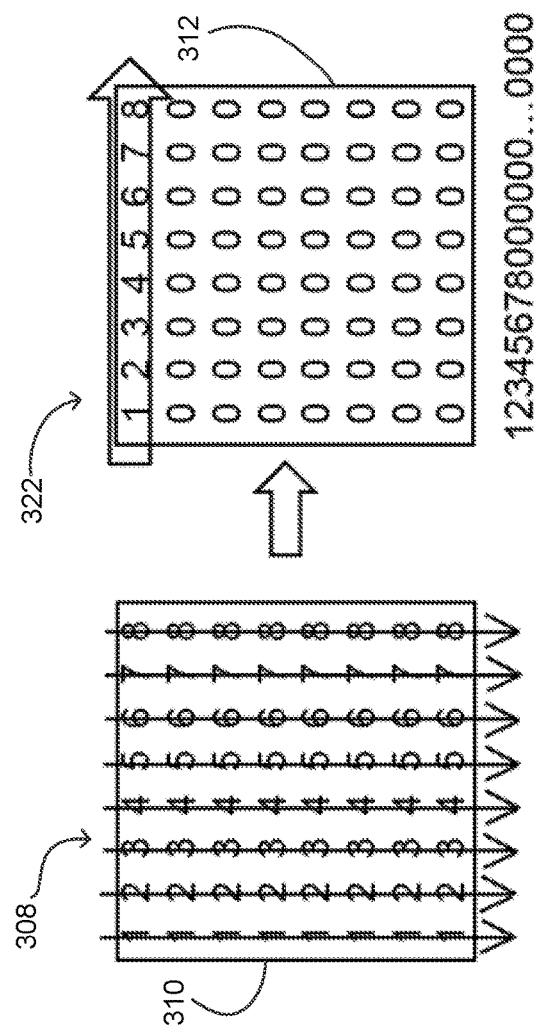
FIG. 8A
FIG. 8B

ONE-DIMENSIONAL TRANSFORM MODES AND COEFFICIENT SCAN ORDER

CROSS REFERENCE TO RELATED APPLICATIONS

This application is the National Stage Entry under 35 U.S.C. § 371 of Patent Cooperation Treaty Application No. PCT/US2015/062173, filed Nov. 23, 2015, which claims the benefit of U.S. Provisional Patent Application No. 62/082,991 filed on Nov. 21, 2014, the disclosures of which are hereby incorporated by reference in their entireties.

BACKGROUND

With ever increasing demands for high-quality videos, diversity of services, and fast delivery, various video encoders, decoders, and coding techniques have been attempted over the years to increase video compression capability, decrease data loss, and control deployment costs. Among the various video encoders used today, block-based hybrid systems are the most widely deployed. In these systems, an input video signal is processed block by block at an encoder through a process that includes, among other things, prediction, transformation, quantization, coefficient scanning, and entropy coding. The encoded video signal is then transmitted to a decoder where functions inverse to those described above are performed to reconstruct the original video for post-processing and display. One or more aspects of the processes described herein may be improved to increase the efficiency of video coding.

SUMMARY

Methods and apparatus are described for performing one-dimensional (1D) transform and coefficient scanning, and inverse processing. 1D transform may be performed on a video block in a 1D transform direction such as a horizontal or a vertical direction. Based on the 1D transform direction, a scan order may be determined for scanning the transform coefficient block resulting from the 1D transform and/or quantization. The determined scan order may be in a direction orthogonal to the 1D transform direction. For example, the determined scan order may be in a vertical direction if the 1D transform is in a horizontal direction. Likewise, the determined scan order may be in horizontal direction if the 1D transform is in a vertical direction. The foregoing scan order determination logic may be applied for certain types of prediction modes including, for example, inter prediction mode and intra block copy (IBC) prediction mode. In one or more embodiments, the scan order determination logic may be applied only for inter and IBC prediction modes. The 1D transform direction may be signaled via an indication in a video bitstream. The indication may indicate the 1D transform direction that may be used to determine the scan order applied. A transform coefficient block may be constructed based on the determined scan order. Inverse 1D transform may be performed to the transform coefficient block.

A transform coefficient block resulting from 1D transform and/or quantization may be flipped prior to scanning. The flipping may be conducted for certain types of prediction modes such as intra prediction. In one or more embodiments, the flipping may be performed for intra-predicted blocks only. Intra prediction may be performed in an intra prediction direction, and 1D transform may be performed a direction orthogonal to the intra prediction direction. For example, intra prediction may be performed in one of a horizontal or vertical directions, and 1D transform may be performed in the other of the horizontal or vertical directions. The transform coefficient block may be flipped (e.g., after quantization) in a direction that is orthogonal to the 1D transform direction. Indications of the intra prediction direction and 1D transform direction may be sent in a video bitstream. The intra prediction direction and 1D transform direction may be used to determine whether a flipping operation occurred to the transform coefficient block being decoded. Such a determination may be made based on the indicated intra prediction direction and 1D transform direction. For example, when the indicated intra prediction direction is orthogonal to the indicated 1D transform direction (e.g., horizontal intra prediction and vertical 1D transform, or vice versa), it may be concluded that a flip was performed on the transform coefficient block. The direction of the flipping may be determined to be orthogonal to the 1D transform direction. An inverse flip of the transform coefficient block may be perforated based on the determined flipping direction. Inverse 1D transform may be performed to the inverse-flipped transform coefficient block.

A mode for residual differential pulse mode modulation (RDPCM) may be selected and applied to a 1D transform coefficient block. The selection may be made from multiple candidate RDPCM modes such as horizontal RDPCM, vertical RDPCM, or no RDPCM. Quantized coefficient predictors may be generated for each of the candidate RDPCM modes based on original transform coefficients (e.g., before those coefficients are quantized). An absolute sum of quantized coefficient errors may be estimated for each of the candidate RDPCM modes based on the original transform coefficients and the quantized coefficients predictors. The RDPCM mode with the smallest estimated absolute sum of quantized coefficient errors may be selected and applied to the 1D transform coefficient block. In one or more embodiments, the selected RDPCM is applied to DC coefficients only. The selected RDPCM mode may be indicated in a video bitstream and an inverse RDPCM may be performed based on the indication.

A video coding device described herein may include a video encoder and/or a video decoder.

BRIEF DESCRIPTION OF THE DRAWINGS

A more detailed understanding may be had from the following description, given by way of example in conjunction with the accompanying drawings wherein:

FIG. 4A illustrates example bit shifting during 1D horizontal transform.

FIG. 4B illustrates example bit shifting during 1D vertical transform.

FIG. 8A illustrates example 1D horizontal transform and vertical scanning.

FIG. 8B illustrates example 1D vertical transform and horizontal scanning.

DETAILED DESCRIPTION OF ILLUSTRATIVE EMBODIMENTS

A detailed description of illustrative embodiments will now be described with reference to the various Figures. Although this description provides examples of possible implementations, it should be noted that the examples are not intended to limit the scope of the application. Further, a video coding device as described herein may include a video encoder and/or a video decoder.

Figure 1:
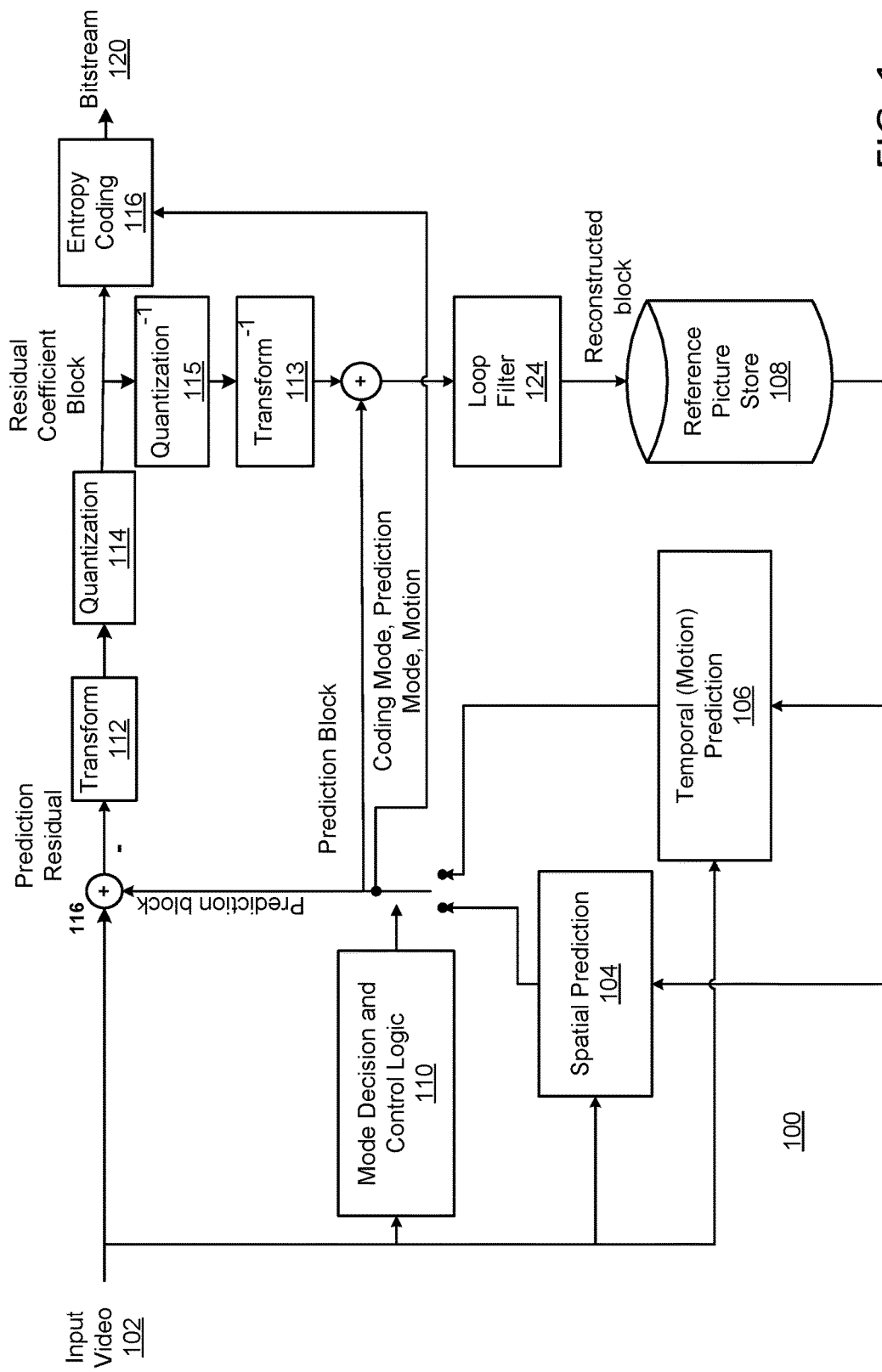
FIG. 1 is a diagram of an example video encoder according to one or more examples described herein.

FIG. 1 is a diagram of an example video encoder 100 in which one or more disclosed embodiments may be implemented. The video encoder 100 may conform to international video coding standards such as the MPEG-1, MPEG-2, MPEG-4, H.264/MPEG-4 Advanced Video Coding (AVC), and/or High Efficiency Video Coding (HEVC). The video encoder 100 may be a standalone unit or a part of a video broadcast system, a cable system, a network-based video streaming service, a gaming application and/or service, a multimedia communication system, and/or a variety of other applications and services. The video encoder 100 may be implemented in hardware, software, or a combination of hardware and software. For example, the video encoder 100 may utilize one or more special purpose processors, general purpose processors, graphics processing units (GPUs), Application Specific Integrated Circuits (ASICs), Field Programmable Gate Array (FPGA) circuits, state machines, and the like. One or more components of the video encoder 100 may be implemented with software or firmware incorporated in a computer-readable medium for execution by a computer or a processor. Examples of computer-readable media include electronic signals (transmitted over wired or wireless connections) and computer-readable storage media such as a read only memory (ROM), a random access memory (RAM), a register, cache memory, semiconductor memory devices, magnetic media (e.g., internal hard disks and removable disks), magneto-optical media, optical media (e.g., CD-ROM disks), and digital versatile disks (DVDs).

As shown in FIG. 1, the video encoder 100 may include a spatial prediction unit 104, a temporal (or motion) prediction unit 106, a reference picture store 108, a motion decision and control logic unit 110, a transform unit 112, an inverse transform unit 113, a quantization unit 114, a de-quantization unit 115, a scan unit (not shown), an entropy coding unit 116, and/or a loop filter 124. Although FIG. 1 depicts the video encoder 100 as having only one unit of each of the components described herein, it will be appreciated that any number of units of the components may be used to implement the functions described herein.

The video encoder 100 may receive an input video signal 102. The input video signal 102 may have a standard resolution (e.g., 640×480) or high resolution (e.g., 1920×1080 and beyond). The video encoder 100 may process the input video signal 102 block by block. Each video block may be referred to herein as a macblock ("MB") or a coding unit ("CU"), and may have one of a plurality of sizes including, 4×4 pixels, 8×8 pixels, 16×16 pixels, 32×32 pixels, or 64×64 pixels. The video encoder 100 may perform prediction on each video block to, for example, exploit redundancy and irrelevancy inherent in the video block so as to reduce the amount of information that need to be compressed and/or delivered. In one or more examples, the video encoder 100 may further partition the video blocks into smaller prediction units and apply prediction on a prediction unit basis. For purposes of illustration, the descriptions herein assume that the video encoder 100 perform prediction on a video block basis.

The video encoder 100 may apply spatial prediction to a current video block at the spatial prediction unit 104. Such a prediction method may allow the video encoder 100 to predict pixels of the current video block using pixels from one or more previously-coded neighboring blocks (referred to herein as "prediction blocks") of the same video frame, for example. Those neighboring block pixels may be highly correlated to the pixels of the current video block because, for example, the relevant video frame may contain many regions of smoothly varying intensity. Thus, by using spatial prediction, the video encoder 100 may be able to remove certain spatial redundancy from the current video block and code only residual pixels that cannot be spatially predicted. Example spatial prediction methods may include intra prediction, intra block copy prediction (IBC), and the like. Intra prediction may predict sample values using pixel information of neighboring samples (e.g., a column or row of samples) in the current frame and not relative to any other frame. Intra block copy (IBC) prediction may predict sample values for an entire block using a block of previously reconstructed sample values from the same frame.

In addition to or in lieu of spatial prediction, the video encoder 100 may apply temporal prediction (e.g., "inter prediction" or "motion compensated prediction") to a video block using the temporal prediction unit 106. Temporal prediction may take advantage of the phenomenon that two adjacent video frames may have high temporal redundancy since typical video sequences do not change rapidly from one frame to the next. Accordingly, the video encoder 100 may use one or more prediction blocks from previously coded video frames to predict the current video block so that temporal redundancy inherent in the video signal 102 may be removed. In one or more examples, the video encoder 100 may be operable to calculate the amount and direction of motion between the current video block and its prediction blocks using, for example, one or more motion vectors, and utilize the calculated motion information to further improve the efficiency of prediction. In one or more examples, the video encoder 100 may support multiple reference pictures and assign a reference picture index to each coded video block. The video encoder 100 may determine, based on a video block's reference picture index, from which reference picture and/or reference video block of the reference picture store 108 a temporal prediction signal may come.

The prediction mode described herein may be selected based on logics stored in the mode decision and control logic unit 110. Multiple factors may be considered in the selection process including, for example, rate-distortion optimization (RDO) criteria and/or bit rate requirements. In one or more examples, the video encoder 100 may choose a prediction mode whose sum of absolute transform differences (SATD) is the minimum. In one or more examples, the video encoder 100 may select a prediction mode having the smallest rate distortion cost. Various other techniques may also be possible, all of which are within the scope of this disclosure.

The various prediction methods described herein may produce prediction residual, which may comprise a large set of highly correlated pixels. The video encoder 100 may transform (e.g., via the transform unit 112) and quantize (e.g., via the quantization unit 114) the prediction residual into a smaller set of uncorrelated coefficients (referred to herein as "transform coefficients") before scanning those transform coefficients (e.g., via the scan unit described herein) into a one-dimensional sequence of coefficients and feeding the sequence to the entropy coding unit 116. In one or more examples, the video encoder 100 may pass additional information such as coding mode, prediction mode, residual differential pulse code modulation (RDPCM) mode, and/or other coding parameters to the entropy coding unit 116. The additional information may be compressed and packed with the transform coefficients and sent via a video bitstream 120. Details of the aforementioned transform, quantization, and scan operations in accordance with one or more of examples disclosed herein will be further provided herein.

The example video decoder 200 may be located at a receiving end of a bitstream 202 and may receive the bitstream 202 over a variety of transport media including, for example, a public network (e.g., the Internet), an internal network (e.g., a corporate intranet), a virtual private network ("VPN"), a cellular network, a cable network, a serial communication link, an RS-485 communication link, an RS-232 communication link, an internal data bus, and/or the like. The video decoder 200 may utilize block-based decoding; methods that conform to international video standards such as the MPEG-1, MPEG-2, MPEG-4, H.264/MPEG-4 Advanced Video Coding (AVC), and/or High Efficiency Video Coding (HEVC). The video decoder 200 may be a standalone unit or a part of a computer device, a mobile device, a television system, a gaming; console and application, a multimedia communication system, and/or a variety of other devices and applications. The video decoder 200 may be implemented in hardware, software, or a combination of hardware and software. For example, the video decoder 200 may utilize one or more special purpose processors, general purpose processors, graphics processing units (GPUs). Application Specific Integrated Circuits (ASICs), Field Programmable Gate Array (FPGA) circuits, state machines, and the like. One or more components of the video decoder 200 may be implemented with software or firmware incorporated in a computer-readable medium for execution by a computer or a processor. Examples of computer-readable media include electronic signals (transmitted over wired or wireless connections) and computer-readable storage media such as a read only memory (ROM), a random access memory (RAM), a register, cache memory, semiconductor memory devices, magnetic media (e.g., internal hard disks and removable disks), magneto-optical media, optical media (e.g., CD-ROM disks), and digital versatile disks (DVDs).

Figure 2:
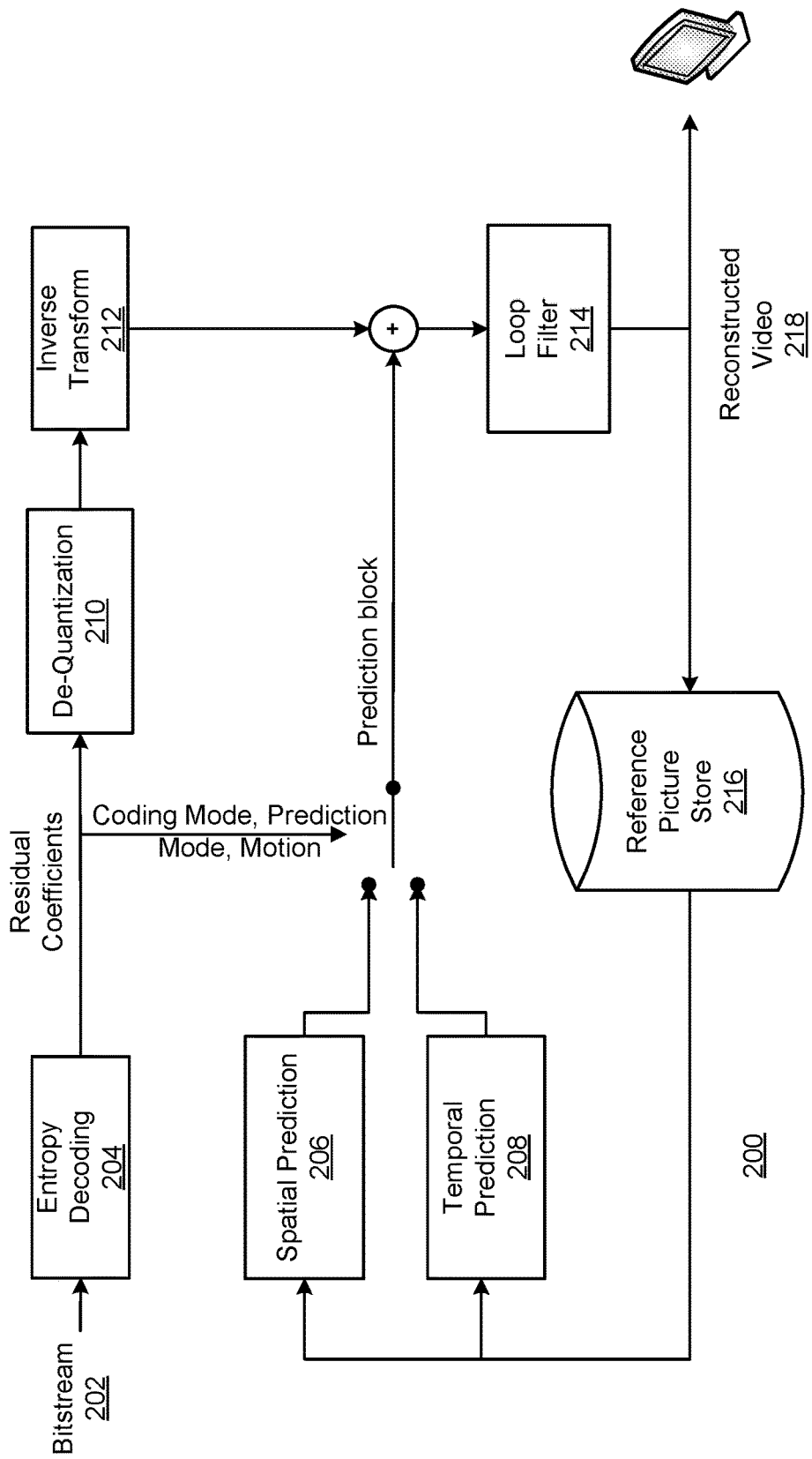
FIG. 2 is a diagram of an example video decoder according to one or more examples described herein.

The video decoder 200 may be operable to reconstruct a video signal based on an encoded version of the video signal (e.g., such as that produced by the video encoder 100). The reconstruction process may comprise receiving a block of encoded video, obtaining the prediction blocks used for encoding the video block, recovering the prediction residual of the video block, and reconstructing the original video block. As such, the video decoder 200 may comprise components that perform functions inverse to those of the video encoder 100. For example, as shown in FIG. 2, the video decoder 200 may comprise an entropy decoding unit 204, a spatial prediction unit 206, a temporal prediction unit 208, a de-quantization unit 210, an inverse transform unit 212, a loop filter 214, and/or a reference picture store 216. The video decoder 200 may receive the video bitstream 202 at the entropy decoding unit 204. The entropy decoding unit 204 may unpack and entropy-decode the bitstream 202, from which the entropy decoding unit 204 may extract information such as the transform coefficients produced by the transform unit 112, the quantization unit 114, and/or the scan unit of the video encoder 100. Additional information including coding mode, prediction mode, RDPCM mode, and/or other parameters used for encoding the video block may also be extracted. Some of the extracted information may be sent to the spatial prediction unit 206 (e.g., if the video signal is intra-coded or IBC-coded) and/or the temporal prediction unit 208 (e.g., if the video signal is inter-coded) to obtain the prediction blocks. A transform coefficient block may be rebuilt and de-quantized (e.g., at the de-quantization unit 210) and inverse transformed (e.g., at the inverse transform unit 212) to derive the prediction residual of the video block. The video decoder 200 may combine the residual video block and the prediction blocks to reconstruct the video block to its original form.

The video decoder 200 may apply in-loop filtering on the reconstructed video block at, e.g., the loop filter 214. Various in-loop filtering techniques may be used including, for example, deblocking filtering and adaptive loop filtering. Upon reconstruction and filtering, the video decoder 200 may put the reconstructed video 218 in the reference picture store 216 and may subsequently use the video blocks of the reference picture store 216 to code other images and/or drive a display device. Similar reconstruction and in-loop filtering may also take place at the video encoder 100 via, for example, de-quantization unit 115, inverse transform unit 113, loop filter 124, and reference picture store 108.

There are various ways to implement the prediction, transform, quantization, scan, de-quantization, and inverse transform processes. For example, the video encoder 100 may use block-based discrete cosine transform (DCT), discrete sine transform (DST), and/or the like in the transform process. The video encoder 100 may pre-define an M×M (M rows and M columns) transform matrix in one of several sizes (e.g., 4×4, 8×8, 16×16, 32×32, and the like). Each row in the M×M transform matrix, denoted as $T_M$, may form a basis vector, and $T_M$ may thus have M basis vectors. The input to the transform unit 112 may be a block with size M×N (M rows and N columns), denoted as $X_{M \times N}$, for example. M and N may have a value equal to 2 to an integer power, e.g., 4, 8, 16, and/or 32. The values of M and N may be the same as or different from each other. $X_{M \times N}$ may be left- and/or right-multiplied by two transform matrices, $T_M$ and $T_N^T$ (superscript T denotes matrix transposition), upon which operation $X_{M \times N}$ may be converted to a representation in the transform domain, denoted as $Y_{M \times N}$, for example. Either of the left- or right-multiplication may be performed first without affecting the result, as shown in Equation (1).

$$Y_{M \times N} = (T_M \times X_{M \times N}) \times T_N^T = T_M \times (X_{M \times N} \times T_N^T) \quad (1)$$

The left-multiplication may project a column of $X_{M \times N}$ or $(X_{M \times N} \times T_N^T)$ to the basis vectors of $T_M$, which may be referred to as vertical transform herein. The right-multiplication may project each row of $(T_M \times X_{M \times N})$ or $X_{M \times N}$ to the basis vectors of $T_N$, which may be referred to as horizontal transform herein.

The video encoder 100 may quantize the transform results to, for example, achieve normalization of the results and a target bit rate, among other things. In one or more examples, normalization may be accomplished by dividing $Y_{M \times N}(i, j)$ ($0 \leq i < M$, $0 \leq j < N$) by $(T_M(0, 0) \times T_N(0, 0) \times \sqrt{MN})$ in which $T_M(0, 0)$ and $T_N(0, 0)$ may represent the top-left elements in $T_M$ and $T_N$, respectively. Target bit rate may be achieved by dividing $Y_{M \times N}(i, j)$ by a quantization step size $Z_{M \times N}(i, j)$, the output of which may be denoted as $W_{M \times N}(i, j)$. In one or more examples, the division operations described herein may be combined and implemented by, for instance, multiplying a scaling factor $S_{M \times N}(i, j)$ and right shifting an appropriate number of bits $Q_{M \times N}(i, j)$ so that an approximation as shown in Equation (2) may be satisfied. It will be appreciated that right shifting a number by n bits may be equivalent to dividing that number by $2^n$.

$$W_{M \times N}(i, j) = \frac{Y_{M \times N}(i, j) \times S_{M \times N}(i, j)}{2^{Q_{M \times N}(i,j)}} \approx \frac{Y_{M \times N}(i, j)}{T_M(0, 0) \times T_N(0, 0) \times \sqrt{MN} \times Z_{M \times N}(i, j)} \quad (2)$$

Multiple step sizes may be used in the quantization process. In one or more examples, 52 pre-defined rational-valued step sizes may be indexed by QP (e.g., QP=0, 1 . . . 51) and ranging from 0.63 (e.g., when QP=0) to 228 (e.g., when QP=51). The step sizes may be configured to increase about $2^{1/6}$ times with each increment of QP, and double for every 6 increments, for example. The step size with index QP+6k (denoted as $Z_{M \times N}$(QP+6k, i, j) herein, where k is a positive integer) may be $2^k$ times of the step size with index QP (denoted as $Z_{M \times N}$(QP, i, j) herein). Accordingly, a division by $Z_{M \times N}$(QP+6k, i j) in Equation (2) may be equivalent to a division by $Z_{M \times N}$(QP, i, j) followed by a k-bit right shift. In one or more examples, six scaling factors may be defined and stored under the example configuration (e.g., as shown in the second row of Table 1). Scaling factors may be used to represent 52 step sizes by controlling the bits of right shifts, for example. To illustrate, Table 1 shows that step size equal to 1 may correspond to QP equal to 4, where scaling factor may be $16384 = 2^{14}$ and right shift bits may be 14.

TABLE 1

Scaling factors for quantization and inverse quantization

| QP %6 | 0 | 1 | 2 | 3 | 4 | 5 |
|---|---|---|---|---|---|---|
| S | 26214 | 23302 | 20560 | 18396 | 16384 | 14564 |
| IS | 40 | 45 | 51 | 57 | 64 | 72 |

An example de-quantization may include dividing $W_{M \times N}(i, j)$ by $(T_M(0, 0) \times T_M(0, 0))$ to normalize inverse transform in advance and/or multiplying $W_{M \times N}(i, j)$ by the quantization step size $Z_{M \times N}(i, j)$. In one or more examples, integer arithmetic may be desirable and as such, the division and multiplication operations may be approximated, for example, by multiplying a scaling factor $IS_{M \times N}(i, j)$ and right shifting $IQ_{M \times N}(i, j)$ bits, to get $\tilde{Y}_{M \times N}(i, j)$, e.g., as shown in Equation (3). Six inverse scaling factors may be defined and stored, e.g., as shown in the third row of Table 1.

$$\tilde{Y}_{M \times N}(i, j) = \frac{W_{M \times N}(i, j) \times IS_{M \times N}(i, j)}{2^{IQ_{M \times N}(i,j)}} \approx \frac{W_{M \times N}(i, j) \times Z_{M \times N}(i, j)}{T_M(0, 0) \times T_N(0, 0) \times \sqrt{MN}} \quad (3)$$

Further, $\tilde{Y}_{M \times N}(i, j)$ may be inverse-transformed back to the spatial domain to derive the reconstructed version of $X_{M \times N}$, denoted as $\tilde{X}_{M \times N}$, as shown in Equation (4).

$$\tilde{X}_{M \times N}(i,j) = (T_M^T \times \tilde{Y}_{M \times N}(i,j)) \times T_N = T_M^T \times (\tilde{Y}_{M \times N}(i,j) \times T_N) \quad (4)$$

The design of the video encoder 100 and video decoder 200 may take several aspects into consideration, including, for example, the dynamic range of the pixel values. Dynamic range may be represented by a bit-depth. For example, a bit-depth of 8 may correspond to a dynamic range of [0, 255]. High quality videos may have larger dynamic range, e.g., 10-bit, 12-bit, 14-bit, and/or the like. Since the input to transform may be prediction errors, which may have a 50% chance to be negative, the dynamic range (e.g., bit-depth) may increase by 1 bit so as to cover both positive and negative value ranges. For example, if the input video has 8-bit depth, the dynamic range of transform input may be [−255, 255] or 9-bit. As such, the dynamic range of the transform input may be denoted as 9+ΔBD, in which ΔBD may be greater than zero for higher quality videos. Table 2 shows example output dynamic ranges for various video coding stages. For example, a matrix multiplication by $T_M$ in the transform stage may cause dynamic range to increase by $\log_2(T_M(0, 0) \times M)$ bits. As another example, quantization may cause dynamic range to decrease by $\log_2(T_M(0, 0) \times T_N(0, 0) \times \sqrt{MN} \times Z_{M \times N}(i, j))$ bits (e.g., as represented by the denominator in Equation (2)). As another example, inverse quantization may cause dynamic range to increase by $$\log_2 \frac{Z_{M \times N}(i, j)}{T_M(0, 0) \times T_N(0, 0) \times \sqrt{MN}}$$

bits (e.g., as shown in Equation (3)). Further, a matrix multiplication by $T_M^T$ in inverse transform may cause dynamic range to increase by $\log_2 T_M(0, 0)$ bits.

TABLE 2

Output Dynamic Range of Each Stage

| Operations | Output Dynamic Range of Each Stage |
|---|---|
| Input | $9 + \Delta BD$ |
| Horizontal transform | $9 + \Delta BD + \log_2(T_N(0, 0) \times N)$ |
| Vertical transform | $9 + \Delta BD + \log_2(T_M(0, 0) \times M \times T_N(0, 0) \times N)$ |
| Quantization | $9 + \Delta BD + \frac{1}{2} \log_2(M \times N) - \log_2 Z_{M\times N}(i, j)$ |
| Inverse Quantization | $9 + \Delta BD - \log_2(T_M(0, 0) \times T_N(0, 0))$ |
| Vertical inverse transform | $9 + \Delta BD - \log_2 T_N(0, 0)$ |
| Horizontal inverse transform | $9 + \Delta BD$ |

The input and output of video coding process may have consistent dynamic range. A number of operations in the video coding process may cause dynamic range to increase and/or decrease. As described herein, transform, inverse transform, the multiplication by $S_{M\times N}(i, j)$ during quantization, and the multiplication by $IS_{M\times N}(i, j)$ during inverse quantization may cause dynamic range to increase. On the other hand, the right shift of $Q_{M\times N}(i, j)$ bits during quantization and the right shift of $IQ_{M\times N}(i, j)$ bits during inverse quantization may cause dynamic range to decrease. Further, the right shifts of $Q_{M\times N}(i, j)$ bits and $IQ_{M\times N}(i, j)$ bits may not necessarily occur during quantization and inverse quantization, respectively. For example, the right shift operations may be distributed to various stages as shown in Table 3, and the dynamic range may eventually go back to $9+\Delta BD$ if, for example, the sum of right shift bits is equal to $Q_{M\times N}(i, j)+IQ_{M\times N}(i, j)$. $Q_{M\times N}(i, j)+IQ_{M\times N}(i, j)$ may be calculated by multiplying Equations (2) and (3), e.g., as shown in Equation (5). Equation (5) may also be represented by Equation (6) after applying appropriate cancellations.

$$\frac{Y_{M\times N}(i, j) \times W_{M\times N}(i, j) \times S_{M\times N}(i, j) \times IS_{M\times N}(i, j)}{2^{Q_{M\times N}(i,j)+IQ_{M\times N}(i,j)}} \approx \quad (5)$$

$$\frac{Y_{M\times N}(i, j) \times W_{M\times N}(i, j) \times Z_{M\times N}(i, j)}{T_M^2(0, 0) \times T_N^2(0, 0) \times MN \times Z_{M\times N}(i, j)}$$

$$2^{Q_{M\times N}(i,j)+IQ_{M\times N}(i,j)} \approx \quad (6)$$

$$S_{M\times N}(i, j) \times IS_{M\times N}(i, j) \times T_M^2(0, 0) \times T_N^2(0, 0) \times MN$$

In these equations, $Q_{M\times N}(i, j)+IQ_{M\times N}(i, j)$ may be equal to $\log_2(S_{M\times N}(i, j) \times IS_{M\times N}(i, j) \times T_M^2(0, 0) \times T_N^2(0, 0) \times MN)$, and independent to the quantization step size $Z_{M\times N}(i, j)$. As an illustration of how the right shifts may be distributed to various coding stages, $Z_{M\times N}(i, j)$ may be assumed to be equal to 1, in which case the corresponding index may be QP=4, as described herein. A look-up in Table 1 may identify a scaling factor $S_{M\times N}(i, j)$ of 16384 and an inverse scaling factor $IS_{M\times N}(i, j)$ of 64, which are exactly 14 and 6 bits, respectively.

TABLE 3

Output dynamic range and number of right shifts at each stage (M = N)

| Stage | Operations | Output DR of Each Stage | Bits of Right Shift |
|---|---|---|---|
| 0 | Input | $9 + \Delta BD$ | |
| 1 | Horizontal transform | $(17/18/19/20) + \Delta BD$ | $(1/2/3/4) + \Delta BD$ |
| | Right shift | 16 | |
| 2 | Vertical transform | $(24/25/26/27)$ | $(8/9/10/11)$ |
| | Right shift | 16 | |

TABLE 3-continued

Output dynamic range and number of right shifts at each stage (M = N)

| Stage | Operations | Output DR of Each Stage | Bits of Right Shift |
|---|---|---|---|
| 3 | Quantization ($\times S_{M\times N}(i, j)$) | 30 | $(19/18/17/16) - \Delta BD$ |
| | Right shift | $(11/12/13/14) + \Delta BD$ | |
| 4 | Inverse Quantization ($\times IS_{M\times N}(i, j)$) | $(17/18/19/20) + \Delta BD$ | $(1/2/3/4) + \Delta BD$ |
| | Right shift | 16 | |
| 5 | Vertical inv. Transform | 22 | 7 |
| | Right shift | 15 | |
| 6 | Horizontal inv. Transform | 21 | $12 - \Delta BD$ |
| | Right shift | $9 + \Delta BD$ | |

In one or more examples, the right shifts described herein may be conducted after one or more video coding stages to support a certain dynamic range implementation (e.g., a 16-bit implementation). As described herein, transform matrix sizes may include 4×4, 8×8, 16×16, 32×32, and/or the like, and the transform matrices may be denoted as $T_M$ (e.g., M=4, 8, 16, and 32). In one or more examples, $T_M(0, 0)$ may be 64, and $S_{M\times N}(i, j) \times IS_{M\times N}(i, j)$ may be equal to $2^{20}$ (e.g., as shown in Table 1). These parameters may be substituted into Table 2 to find the dynamic ranges for one or more video coding stages. For example, based on Equation (6), the right shift bits may be 48/50/52/54 for 4×4/8×8/16×16/32×32 transforms, respectively (the same notation pattern A/B/C/D is also used in Table 3). Various transform techniques may be used by the video codec, including non-square transforms (e.g., M=4, N=16; M=16, N=4; M=8, N=32; M=32, N=8) and/or square transforms (e.g., M=N). In an example case where quantization step size $Z_{M\times N}(i, j)$ is equal to 1, Table 3 shows how the total bits of right shift may be distributed after each processing stage (e.g., as shown in the fourth column of Table 3) and the corresponding dynamic ranges (e.g., theoretical dynamic range values) after the right shifts (e.g., as shown by the second and third columns of the bottom row for each stage). Also, as shown in Table 3, the output of Stage 3 (e.g., quantization) may be the transform coefficients to be coded into the bitstream 120, and the output of Stage 6 (e.g., inverse transform) may be the residual used to reconstruct the video. The dynamic ranges of these stages may be made consistent (e.g., substantially consistent) with their theoretical values, and the outputs of one or more other stages may be fit into the desired range (e.g., 16-bit) by right-shifting appropriate number of bits. It should be noted here that the output dynamic ranges shown in Table 3 may vary in practical implementations. For example, the output of Step 5 as shown (e.g., equal to 15) may be conservative since rounding is taken into consideration.

The video encoder 100 and/or video decoder 200 may support multiple transform modes including, for example, 2-dimensional (2D) transform in both a horizontal and vertical directions, one-dimensional (1D) transform in only a horizontal direction (e.g., skipping vertical direction transform), 1D transform in only a vertical direction (e.g., skipping horizontal direction transform), and/or 2D transform skip (e.g., skipping transform in both horizontal and vertical directions). For one or more of transform modes, the video encoder 100 may apply bit shifts and/or scaling to maintain the desired dynamic range. To illustrate, assuming again a 16-bit dynamic range implementation (other implementations are also within the scope of this disclosure), Tables 4-7 show how the total bits of a right shift may be distributed, at various processing stages when a certain transform mode is applied. The tables also show that the dynamic range at the end of one or more processing stages may be increased to 16-bit to, for example, improve the precision of intermediate data and/or maintain a good level of performance, among other things. For example, the dynamic range of the output of stage 3 in Table 4 (using "horizontal only" transform mode) may be increase from 15-bit to 16-bit. The dynamic range of the outputs of stage 1 and stage 3 in Table 5 (using "vertical only" transform mode) may be increased from 9+ΔBD and 10+ΔBD, respectively, to 16-bit. The same type of dynamic control may be applied for both "horizontal only" and "vertical only" transform modes.

TABLE 4

Output Dynamic Range and Bit Shifting with Horizontal Only Transform

| Stage | Operations | Output DR of Each Stage | Bits of Right Shift |
|---|---|---|---|
| 0 | Input | 9 + ΔBD | |
| 1 | Horizontal transform | (17/18/19/20) + ΔBD | (1/2/3/4) + ΔBD |
| | Right shift | 16 | |
| 2 | Quantization ($\times S_{M \times N}(i, j)$) | 30 | (20/19.5/19/18.5) − ΔBD |
| | Right shift | (10/10.5/11/11.5) + ΔBD | |
| 3 | Inverse Quantization ($\times IS_{M \times N}(i, j)$) | (16/16.5/17/17.5) + ΔBD | (1/1.5/2/2.5) + ΔBD |
| | Right shift | 15 | |
| 4 | Horizontal inv. Transform | 21 | 12 − ΔBD |
| | Right shift | 9 + ΔBD | |

TABLE 5

Output Dynamic Range and Bit Shifting with Vertical Only Transform

| Stage | Operations | Output DR of Each Stage | Bits of Right Shift |
|---|---|---|---|
| 0 | Input | 9 − ΔBD | |
| 1 | Vertical transform | (17/18/19/20) + ΔBD | (8/9/10/11) |
| | Right shift | 9 + ΔBD) | |
| 2 | Quantization ($\times S_{M \times N}(i, j)$) | 23 + ΔBD | (13/12.5/12/11.5) − ΔBD |
| | Right shift | (10/10.5/11/11.5) + ΔBD | |
| 3 | Inverse Quantization ($\times IS_{M \times N}(i, j)$) | (16/16.5/17/17.5) + ΔBD | (6/6.5/7/7.5) |
| | Right shift | 10 + ΔBD | |
| 4 | Vertical inv. Transform | 16 + ΔBD | 7 |
| | Right shift | 9 + ΔBD | |

TABLE 6

Output Dynamic Range and Bit Shifting with Transform Skipped for Both Directions

| Stage | Operations | Output DR of Each Stage | Bits of Right Shift |
|---|---|---|---|
| 0 | input | 9 + ΔBD | |
| 1 | Quantization ($\times S_{M \times N}(i, j)$) | 23 + ΔBD | 14 |
| | Right shift | 9 + ΔBD | |
| 2 | Inverse Quantization ($\times IS_{M \times N}(i, j)$) | 15 + ΔBD | 6 |
| | Right shift | 9 + ΔBD | |

TABLE 7

Bits for Right Shift at the Quantization and Inverse Quantization Stages

| | Hor. & Ver. | Hor. Only | Ver. Only | Both Skipped |
|---|---|---|---|---|
| $Q_{M \times N}(i, j)$ | (19/18/17/16) − ΔBD | (20/19.5/19/18.5) − ΔBD | (13/12.5/12/11.5) − ΔBD | 14 |
| $IQ_{M \times N}(i, j)$ | (1/2/3/4) + ΔBD | (1/1.5/2/2.5) + ΔBD | (6/6.5/7/7.5) | 6 |

On the encoder side, with 2D transform, the output of residual after going through forward transform and quantization may be described as follows:

$$\frac{TransformCoef}{[2^{\log_2 nT} \cdot 2^6 \cdot 2^B \div 2^{maxDR}] \cdot [2^{\log_2 nT} \cdot 2^6]} \cdot$$

$$\frac{f[QP_{rem}]}{[2^{14} \cdot 2^{QP_{per}} \cdot 2^{maxDR} \div 2^B \div 2^{\log_2 nT}]} \overline{[2^{14} \cdot 2^{QP_{per}} \cdot 2^{maxDR} \div 2^B \div 2^{\log_2 nT}]}$$

may be applied in the quantization stage. $[2^{\log_2 nT} \cdot 2^6 \cdot 2^B \div 2^{maxDR}]$ may be from bit shifting in a first transform direction (e.g., horizontal). $[2^{\log_2 nT} \cdot 2^6]$ may be from bit shifting in a second transform direction (e.g., vertical). Upon reorganization, the output formula for 2D transform mode may become $$\frac{TransformCoef}{2^{12} \cdot nT} \cdot \frac{f[QP_{rem}]}{2^{14} \cdot 2^{QP_{per}}}$$

which matches the theoretical formula shown below.

$$\frac{TransformCoef}{(2^6 \cdot \sqrt{nT})^2} \cdot \frac{1}{Q_{step}}$$

With 2D transform skip, the output of residual after going through forward transform and quantization may be described as follows:

$$Residuals \cdot [2^{maxDR} \div 2^B \div 2^{\log_2 nT}] \cdot \frac{f[QP_{rem}]}{[2^{14} \cdot 2^{QP_{per}} \cdot 2^{maxDR} \div 2^B \div 2^{\log_2 nT}]}$$

$$\frac{f[QP_{rem}]}{[2^{14} \cdot 2^{QP_{per}} \cdot 2^{maxDR} \div 2^B \div 2^{\log_2 nT}]}$$

may be applied in quantization. $[2^{maxDR} \div 2^B \div 2^{\log_2 nT}]$ may be from bit shifting in order to, for example, compensate the effect of not performing transform. Upon reorganization, the output formula for 2D skip mode may become $$Residuals \cdot \frac{f[QP_{rem}]}{2^{14} \cdot 2^{QP_{per}}}$$

which matches the theoretical formula shown below.

$$Residuals \cdot \frac{1}{Q_{step}}$$

With 1D transform, the output of residual after going through forward transform and quantization may be expressed by the following theoretical formula:

$$\frac{TransformCoef}{2^6 \cdot \sqrt{nT}} \cdot \frac{1}{Q_{step}} = \frac{TransformCoef}{2^6 \cdot \sqrt{nT}} \cdot \frac{f[QP_{rem}]}{2^{14} \cdot 2^{QP_{per}}}$$

To match the theoretical output, appropriate bit shifts may be applied in the transform and/or quantization stages. For example, with 1D horizontal only transform, an example approach for bit shifting in the 1D transform stage may be to keep the bit shift similar to (e.g., the same as) the bit shift in the first transform (e.g, horizontal transform) direction of the 2D transform mode. Such an approach may ensure, among other things, that the output after the first bit shift take advantage of the 16-bit dynamic range. The bit shift in transform function may be $\gg \log_2 nT+6+B-maxDR$, where $\gg$ represents a right shift. The output after the shift may be expressed as $$\frac{TransformCoef}{[2^{\log_2 nT} \cdot 2^6 \cdot 2^B \div 2^{maxDR}]}$$

Further, with 1D horizontal only transform mode, the bit shifting and scaling in the quantization stage may resemble $$\frac{f[QP_{rem}]}{\left[\sqrt{nT} \cdot 2^{14} \cdot 2^{QP_{per}} \cdot 2^{maxDR} \div 2^B \div 2^{\log_2 nT}\right]}$$

of the formula below:

$$\frac{TransformCoef}{[2^{\log_2 nT} \cdot 2^6 \cdot 2^B \div 2^{maxDR}]} \cdot \frac{f[QP_{rem}]}{\left[\sqrt{nT} \cdot 2^{14} \cdot 2^{QP_{per}} \cdot 2^{maxDR} \div 2^B \div 2^{\log_2 nT}\right]}$$

Figure 3A:
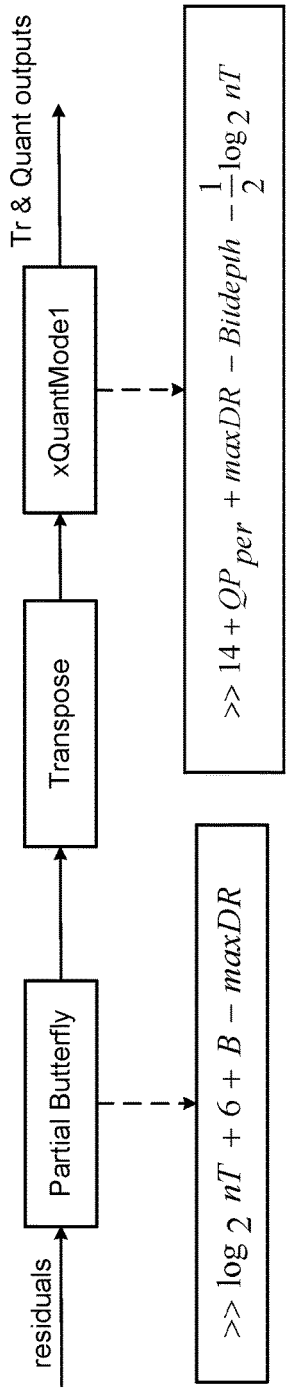
FIG. 3A illustrates an example 1D horizontal transform process.

An example approach is to multiply the input to quantization by $f[QP_{rem}]$ and apply a right bit shift$\gg$ $$14 + QP_{per} + maxDR - Bitdepth - \frac{1}{2}\log_2 nT$$

to the result. The process described herein for the 1D horizontal only transform mode may be illustrated by the diagram in FIG. 3A.

Figure 3B:
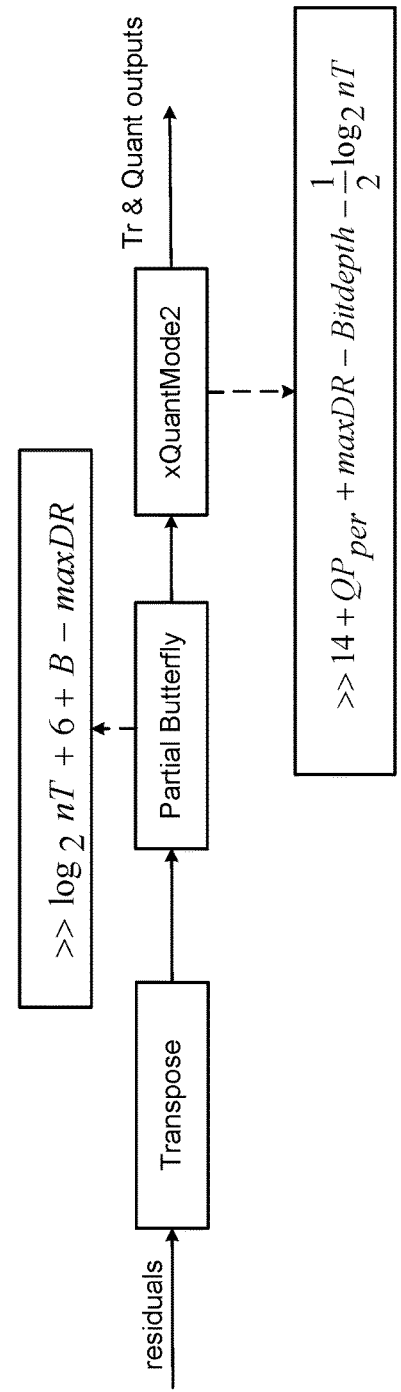
FIG. 3B illustrates an example 1D vertical transform process.

The theoretical formula for residual output in the 1D vertical only transform mode may be the same as that for the 1D horizontal only transform mode. Therefore, similar (e.g., the same) bit shifts during transform and quantization as those applied in the 1D horizontal only transform mode may be applied in the 1D vertical only transform mode, the process of which may be illustrated by the diagram in FIG. 3B.

On the decoder side, with inverse 2D transform, the output of residual after going through de-quantization and inverse transform may be described as follows:

$$\frac{Residuals}{[2^{6+1}] \cdot [2^{6+maxDR-1-B}]} \cdot \frac{f'[QP_{rem}]}{\left[2^6 \div 2^{maxDR} \cdot 2^B \cdot 2^{\log_2 nT} \div 2^{QP_{per}}\right]}$$

-continued $$\frac{f'[QP_{rem}]}{\left[2^6 \div 2^{maxDR} \cdot 2^B \cdot 2^{\log_2 nT} \div 2^{QP_{per}}\right]}$$

may be applied in the de-quantization stage. $[2^{6+1}]$ may be from bit shifting in a first inverse transform direction (e.g., inverse horizontal). $[2^{6+maxDR-1-B}]$ may be from bit shifting in a second inverse transform direction (e.g., inverse vertical). Upon reorganization, the output formula for inverse 2D transform may become:

$$\frac{Residuals}{2^{12} \cdot nT} \cdot \frac{f'[QP_{rem}] \cdot 2^{QP_{per}}}{2^6},$$

which matches the theoretical formula shown below.

$$\frac{Residuals}{\left(2^6 \cdot \sqrt{nT}\right)^2} \cdot Q_{step}$$

With inverse 2D transform skip, the output of residual after going through de-quantization and inverse transforms may be described as follows:

$$Residuals \div [2^{maxDR} \div 2^B \div 2^{\log_2 nT}] \cdot \frac{f'[QP_{rem}]}{\left[2^6 \div 2^{maxDR} \cdot 2^B \cdot 2^{\log_2 nT} \div 2^{QP_{per}}\right]}$$

$$\frac{f'[QP_{rem}]}{\left[2^6 \div 2^{maxDR} \cdot 2^B \cdot 2^{\log_2 nT} \div 2^{QP_{per}}\right]}$$

may be applied in the de-quantization stage. $[2^{maxDR} \div 2^B \div 2^{\log_2 nT}]$ may be from bit shifting in order to, for example, compensate the effect of not performing inverse transform. Upon reorganization, the output for inverse 2D skip mode may become $$Residuals \cdot \frac{f'[QP_{rem}] \cdot 2^{QP_{per}}}{2^6},$$

which matches the theoretical formula shown below.

$$Residuals \cdot Q_{step}$$

With inverse 1D transform, the output of residual after going through de-quantization and inverse transform may be expressed by the following theoretical formula:

$$\frac{Residuals}{2^6 \cdot \sqrt{nT}} \cdot Q_{step} = \frac{Residuals}{2^6 \cdot \sqrt{nT}} \cdot \frac{f'[QP_{rem}] \cdot 2^{QP_{per}}}{2^6}$$

To match the theoretical output, appropriate bit shifts may be applied in the de-quantization and/or inverse transform stages. For example, with inverse 1D horizontal only transform, an example approach is to keep the scaling factor as $f'[QP_{rem}]$ but change bit shifting to $\gg$ $$6 - (QP_{per} + maxDR - Bitdepth - \log_2 nT) - \frac{1}{2}\log_2 nT,$$

where >> represents right shifting. Such an approach may ensure, among other things, that the dynamic range of the de-quantized coefficients remain 16-bit. Using the example approach, the output after the de-quantization stage may be expressed as $$\frac{TransformCoef}{[2^{\log_2 nT} \cdot 2^6 \cdot 2^B \div 2^{maxDR}]}$$

Further, the bit shift in the inverse 1D horizontal only transform stage may match $[2^6 \cdot 2^{maxDR} \div 2^B]$ in the formula below:

$$\frac{Residuals}{[2^6 \cdot 2^{maxDR} \div 2^B]} \cdot \frac{f'[QP_{rem}]}{[2^6 \div 2^{maxDR} \cdot 2^B \cdot 2^{\log_2 nT} \div 2^{QP_{per}}]}$$

and the input to inverse transform may be right bit-shifted by >>6+maxDR−Bitdepth. The process described herein for the inverse 1D horizontal only transform mode may be illustrated by the diagram in FIG. 4A.

The theoretical formula for residual output in the inverse 1D vertical only transform mode may be the same as that for the inverse 1D horizontal only transform mode. Therefore, similar e.g., the same) bit shifts during inverse transform and de-quantization as those applied in the 1D horizontal only transform mode may be applied in the 1D vertical only transform mode, the process of which may be illustrated by the diagram in FIG. 4B. The example bit shifts and the corresponding output dynamic range after each stage in the "horizontal only" and "vertical only" 1D transform modes as described herein may be summarized by Table 8.

TABLE 8

Summary of Example Bit Shifts and Output Dynamic Range

| Operation Stage | Output DR | Bits of Right Shift |
|---|---|---|
| Input (encoder side) | 9 (B) | |
| Horizontal or Vertical Transform | 17/18/19/20 | $\log_2 nT + 6 + B - maxDR$ (1/2/3/4) |
| Right Shift | 16 (maxDR) | |
| Quantization | 30 | $14 + QP_{per} + maxDR - B - \frac{1}{2}\log_2 nT$ (20/19.5/19/18.5) |
| Right Shift | 10/10.5/11/11.5 | |
| Input (decoder side) | 10/10.5/11/11.5 | |
| Inverse Quantization | 16/16.5/17/17.5 | $6 - QP_{per} - maxDR + B + \frac{1}{2}\log_2 nT$ (0/0.5/1/1.5) |
| Right Shift | 16 (maxDR) | |
| Horizontal or Vertical Inverse Transform | 22 | $6 + maxDR - B$ (13) |
| Right Shift | 9 (B) | |

Figure 5:
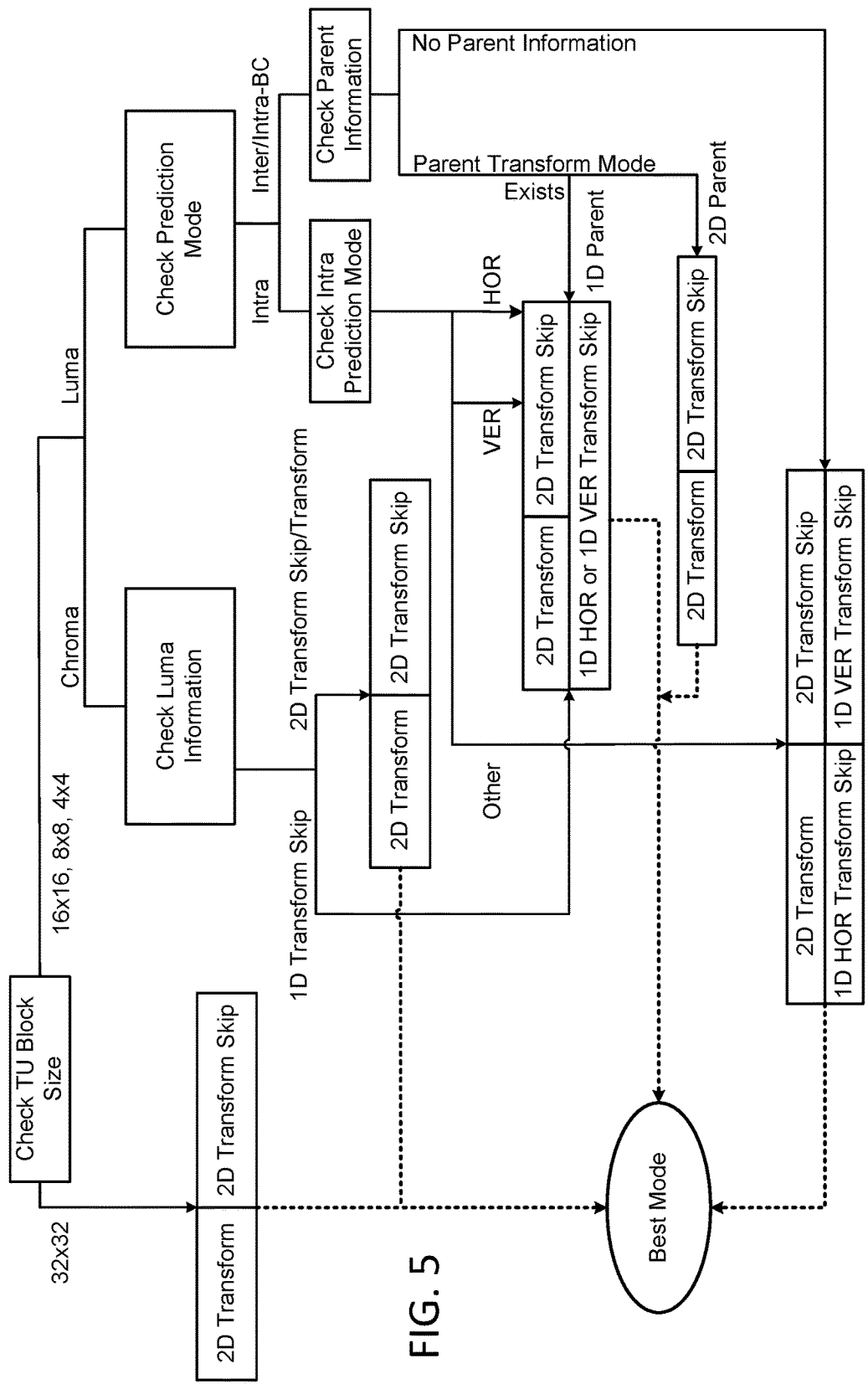
FIG. 5 illustrates example methods for selecting a transform mode.

The video encoder 100 may utilize various methods for selecting a transform mode (e.g., 1D horizontal only transform, 1D vertical only transform, 2D transform, or 2D skip transform) for a given residual block. In one or more examples, the video encoder 100 may utilize a rate-distortion optimization (RDO) process to select the appropriate transform mode. Such a process may use various distortion models (e.g., sum of square differences or SSD, sum for absolute differences or SAD, and/or the like) to calculate the rate distortion for each candidate transform mode, and select the transform mode with the best results, for example. Various techniques may be employed to reduce the complexity of the selection process (and thereby speed up the video coding process). FIG. 5 illustrates some example techniques. One of the example techniques is to conduct RDO evaluation of the 1D transform modes only for smaller block sizes (e.g., such as 4×4, 8×8, and/or 16×16). Another example technique is to disable RDO evaluation of certain transform modes and/or for certain block sizes. For example, the video encoder 100 may disable RDO evaluation of the 2D transform skip mode for one or more block sizes because of the potential impact that transform mode may have on coding efficiency. Offline experiments may be performed to assess the potential impact. If, based on the offline experiments, a decision is made to disable 2D transform skip for one or more of the block sizes, the video encoder 100 may, at run time, only perform RDO evaluation of the other transform modes (e.g., 1D horizontal transform, 1D vertical transform, and 2D transform).

The video encoder 100 may link RDO evaluation to the prediction mode applied. For example, with respect to intra-predicted blocks, if a block is predicted by horizontal intra prediction, the video encoder 100 may perform RDO evaluation only for the 1D horizontal transform mode since prediction residual may exist only in the horizontal direction. Likewise, if a block is predicted by vertical intra prediction, the video encoder 100 may perform RDO evaluation for only the 1D vertical transform mode. Thus, the video encoder 100 may determine, at the early stage of the coding process (e.g., at the prediction stage), that only one 1D transform mode need RDO evaluation.

Figure 6:
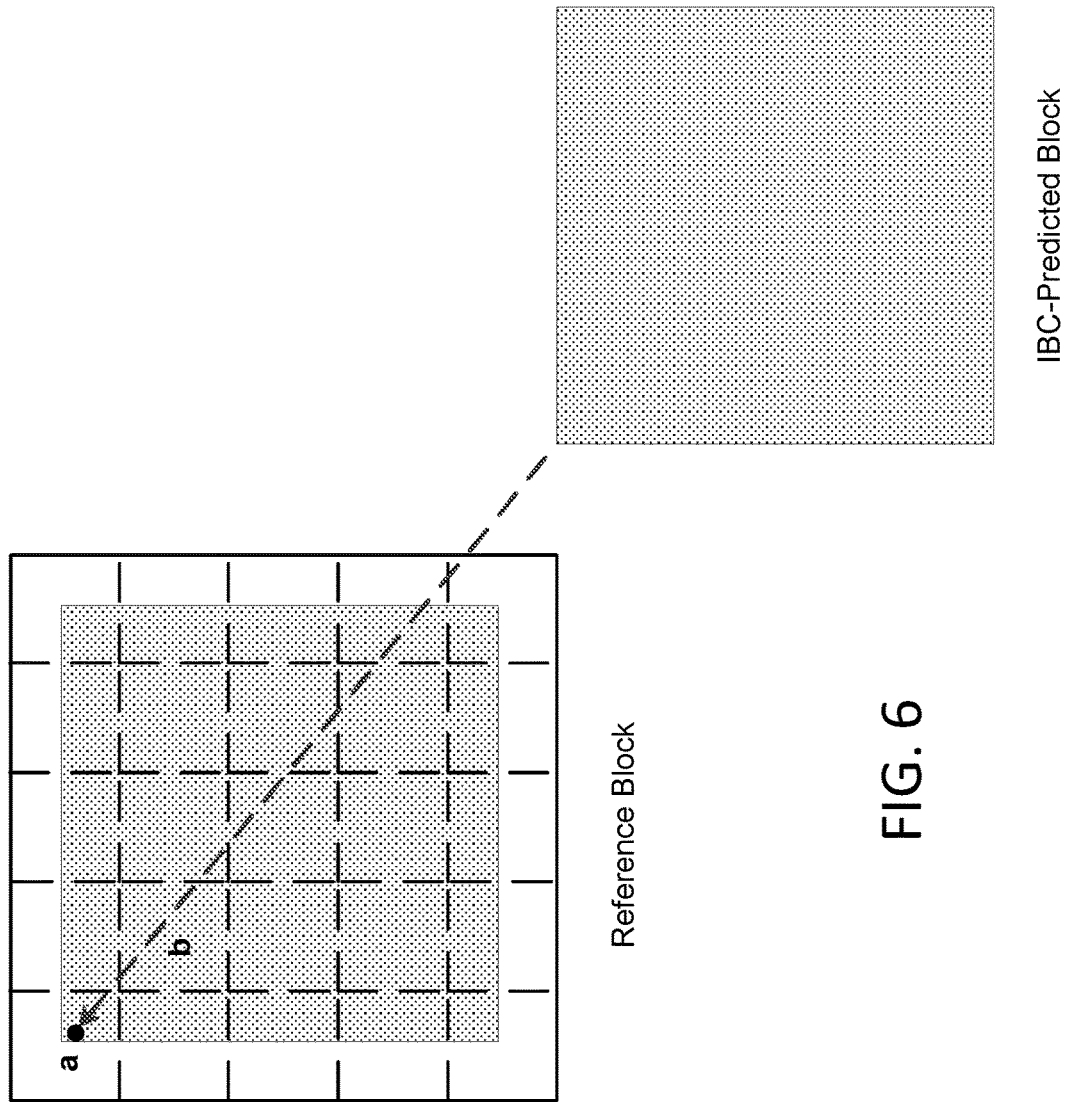
FIG. 6 illustrates example methods for selecting a reference block.

With respect to IBC-predicted blocks, the video encoder 100 may exploit the similarities between a current IBC-predicted block and its prediction block(s), and apply the same transform mode selected for the prediction block(s) to the current block. The video encoder 100 may identify the prediction block(s) using techniques illustrated by FIG. 6, for example. As shown, the video encoder 100 may use the closest 4×4 block (e.g., block (a) in FIG. 6) that may be retrieved (e.g., starting from a pixel pointed by a motion vector). The video encoder 100 may use the first block (e.g., block (b) in FIG. 6) inside the coding unit block that covers the IBC-predicted block (e.g., starting from the pixel pointed by a motion vector). Other techniques for identifying the prediction block(s) may also be possible and are within the scope of this disclosure.

The video encoder 100 may select a transform mode for smaller child blocks based on the transform mode selected for an associated larger parent block. Parent and child blocks may be different coding units (or CU) at neighboring positions in a hierarchical CU structure. For example, given an 8×8 child block, its parent block may be a 16×16 block in the upper level of the hierarchical CU structure. The transform mode selected for the parent block may be applied for the child blocks when pixel similarities exist between the parent block and the child blocks. The video encoder 100 may conduct a full RDO evaluation (e.g., performing RDO evaluation for all of the potential transform modes) for the parent block. Based on the full RDO evaluation, the video encoder 100 may select a transform mode for the parent block and thereafter skip evaluating the same transform mode for the associated child blocks. For example, when the 1D vertical transform mode is selected for the parent block over the 1D horizontal transform mode, the video encoder 100 may skip evaluating the 1D horizontal transform mode for the child blocks and only evaluate the other candidate transform modes (e.g., such as the 2D transform mode, 2D transform skip mode, and 1D vertical transform mode). Likewise, when the 1D horizontal transform mode is selected for the parent block over the 1D vertical transform, the video encoder 100 may evaluate only the 2D transform mode, 2D transform skip mode, and 1D horizontal transform mode, and skip evaluating the 1D vertical transform mode.

The video encoder 100 may select a transform mode for chroma components based on the transform mode selected for luma components, or vice versa. For example, the transform mode selected for the luma components may provide guidance to how transform mode selection may be made for the chroma components when pixel similarities exist between the luma and chroma components. The video encoder 100 may conduct a full RDO evaluation (e.g., performing RDO evaluation for all of the potential transform modes) for the luma components. Based on the RDO evaluation, the video encoder 100 may select a transform mode for the luma components and thereafter skip evaluating the certain transform modes for the chroma components. For instance, if one of the 1D transform modes is selected for the luma components after a full RDO evaluation, only a subset of the candidate transform modes may be evaluated for the chroma components (e.g., such as the 1D transform mode selected for the luma component, 2D transform, and 2D skip transform).

The video encoder 100 may terminate RDO evaluation early upon a finding that a residual block or a transform coefficient block consists of zero values. For example, if the prediction residual of a video block is all zeros, the video encoder 100 may decide that no transform mode evaluation is necessary, and skip the whole RDO process for the block. If, upon checking a transform mode, the video encoder 100 finds that an all-zero transform coefficient block may result, the video encoder 100 may select that transform mode and skip evaluating the other transform modes. The early termination or skipping of the RDO process may be implemented for all prediction modes or for some prediction modes. For example, the video encoder 100 may adopt the early termination approach only for inter- or IBC-predicted blocks upon assessing the coding performance thereof. In some situations, however, the video encoder 100 may check certain transform forms in spite of the presence of zero-only coefficients so as to prevent or reduce potential coding loss. For example, the video encoder may decide to check the 2D transform mode and/or the 2D transform skip mode before terminating the RDO process, even if the relevant transform coefficient block contains only zero coefficients.

Figure 7:
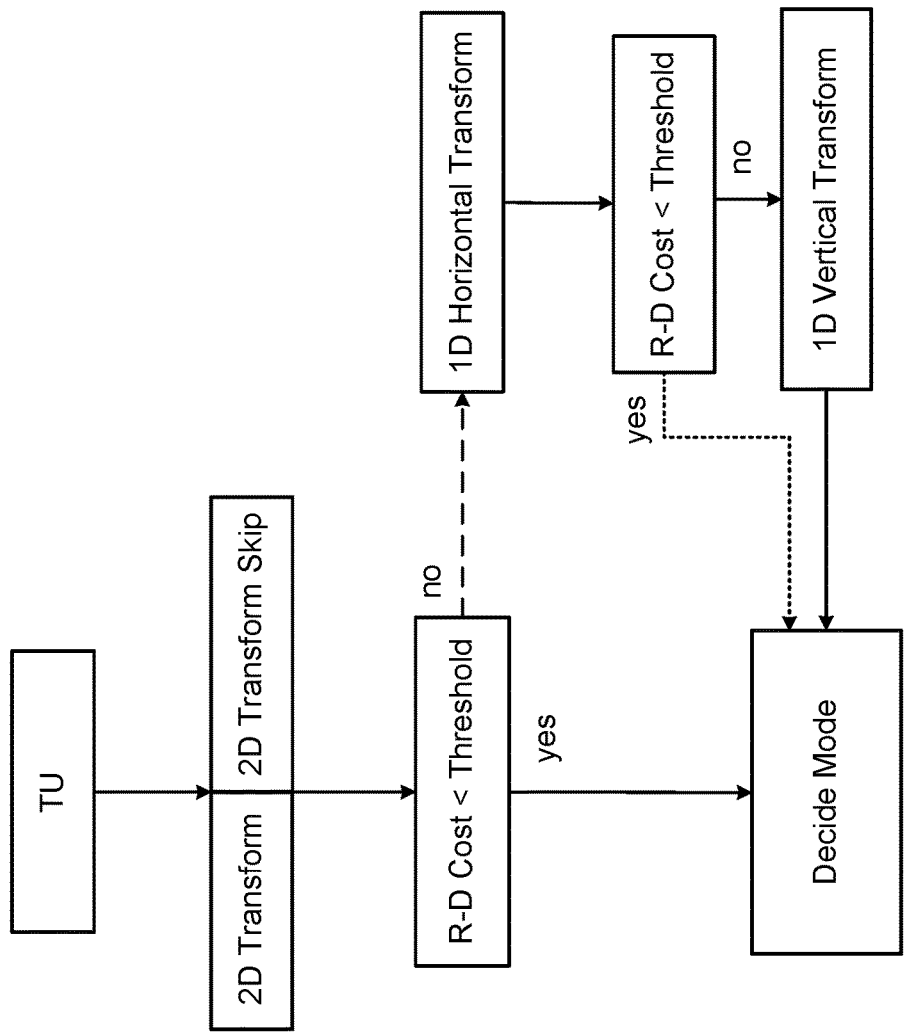
FIG. 7 illustrates an example RDO evaluation process based on a threshold.

Early termination of the RDO process may be based on other criteria as well. For example, an early termination mechanism may be implemented based on one or more coding parameter thresholds. Such thresholds may be predetermined (e.g., set up beforehand based on offline experiments) and/or changed dynamically. FIG. 7 illustrates an example RDO process. For instance, the video encoder 100 may impose a threshold based on rate distortion (R-D) cost, the value of which may be determined based on offline tests. The video encoder 100 may use the threshold in the coding process to determine whether certain transform modes (e.g., 1D transform modes) should be checked. In one or more examples, the video encoder 100 may decide that the R-D cost of applying 2D and 2D transform skip is higher than the threshold, at which point the video encoder 100 may proceed to check the cost for either 1D horizontal transform or 1D vertical transform. If the R-D cost of applying either of those 1D transform modes is still higher than the set threshold, the video encoder 100 may proceed to check the other of the 1D transform modes; otherwise, the video encoder 100 may terminate the RDO process. In one or more examples, the video encoder 100 may skip the threshold setting procedure and terminate the RDO process when, for example, the R-D cost of a skip mode (e.g., 1D horizontal, 1D vertical, or 2D skip) approaches a magnitude larger than the R-D cost of the 2D transform mode.

The video encoder 100 may consider the correlation characteristics of the residual blocks when determine which transform mode to apply. For example, if a residual block has higher correlation horizontally than vertically, the video encoder 100 may select 1D horizontal only transform. If the residual block has high correlation in both the horizontal and vertical directions, the video encoder may select 2D transform. If the block has low correlation in both of the horizontal and vertical directions, the video encoder 100 may select 2D transform skip mode. In one or more examples, a metric capable of identifying the ratio of horizontal correlation versus vertical correlation for a residual block (e.g., the ratio between horizontal and vertical covariance of the residual of one video block) may be provided to facilitate the RDO decision process.

The video encoder 100 may utilize different transform selection methods for different image frames. In an example scenario, the video encoder 100 may have a low delay (LD) and random access (RA) setting, under which some frames may be reference frames to others. The encoder may determine whether to perform the RDO evaluation methods described herein (e.g., early termination, selecting transform modes for the chroma components based on selections made for the luma components, and the like) based on the frame type. For example, the video encoder 100 may apply one or more of the methods described herein to frames that are not used as reference frames, while not applying the methods for reference frames. Numerous benefits may result from this approach such as preventing prediction errors (if any) from propagating to higher level frames and/or reducing the complexity of the video encoder 100.

When a 1D transform mode (e.g., 1D horizontal only or 1D vertical only) is selected through an evaluation process (e.g., the RDO evaluation process described herein), and applied to a residual block, the resulting transform coefficients (after the 1D transform and/or quantization) may exhibit characteristics that indicate how the transform coefficients may be further processed to increase coding efficiency. For example, the coefficients generated from 1D transform may be more directional than those generated from 2D transform or 2D transform skip. This characteristic may be illustrated by FIGS. 8A-8B. As shown in FIG. 8A, after 1D horizontal only transform 302 is performed on a residual block 304, non-zero transform coefficients (e.g., those with higher residual energy) may statistically concentrate more on the left side of the resulting transform coefficient block 306 along a vertical direction (e.g., as shown by the non-zero numbers in the transform coefficient block 306). Similarly, as shown in FIG. 8B, when 1D vertical only transform 308 is performed on a residual block 310, non-zero coefficients may statistically concentrate more in the top section of the resulting transform coefficient block 312 along a horizontal direction as shown by the non-zero numbers in the transform coefficient block 312).

The explicitness of the directional characteristic described herein may vary from one transform coefficient block to another based on, for example, the specific prediction method applied to derive each transform coefficient block. For example, the directional distribution of non-zero coefficients may be more explicit for blocks predicted with inter or intra block copy modes than for blocks predicted with intra mode. An example reason for this phenomenon may be that inter and intra block copy predictions tend to produce much smaller residual than intra prediction. In any event, the distribution of non-zero transform coefficients from 1D transform may provide indications to the video encoder 100 with respect to how post-transform processing may be conducted to increase coding efficiency. In one or more examples, the video encoder 100 may look to the 1D transform direction and adaptively (e.g., based on the 1D transform direction) determine a scan order for the transform coefficient block.

Figure 9:
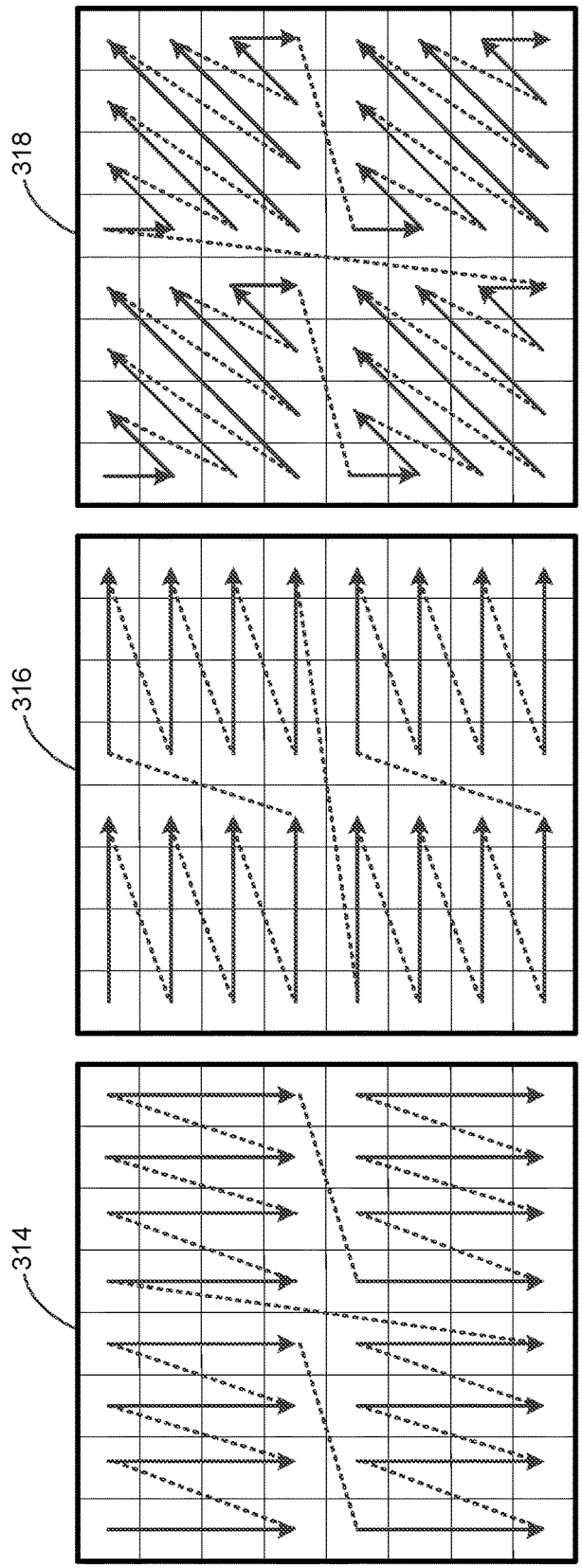
FIG. 9 illustrates example scan orders.

FIG. 9 shows three example coefficient scan orders, e.g., vertical scan 314, horizontal scan 316, and diagonal scan 318. With the vertical scan 314, the video encoder 100 may start at an upper left corner of the transform coefficient block and move downwards to cover an entire column before moving right and repeating the same pattern in the next column. With the horizontal scan 316, the video encoder 100 may start at an upper left corner of the transform coefficient block and move from left to right to cover an entire row before moving down and repeating the same pattern in the row below. With the diagonal scan 318, the video encoder 100 may start at an upper left corner of a transform coefficient block and move toward a lower right corner in a zigzag pattern, for example. Although FIG. 9 and the descriptions herein depict the example scan orders with certain directional features, it will be appreciated that other scan orders may also be possible and are within the scope of this disclosure.

The video encoder 100 may adaptively select a scan order based on the 1D transform direction. For example, the scan order may be determined to be in a direction orthogonal to the 1D transform direction. As shown in FIG. 8A, when 1D horizontal transform 302 is performed, the video encoder 100 may determine that the scan order should be in a vertical direction 320 so that the transform coefficients with higher residual energy (e those represented by the non-zero values in the transform coefficient block 306) may be processed first. Likewise, as shown in FIG. 8B, when 1D vertical transform 308 is performed, the video encoder 100 may determine that the scan order should be in a horizontal direction 322 so that the transform coefficients concentrated in the bottom section of the transform coefficient block 312 (e.g., the coefficients with higher residual energy, as represented by the non-zero values in the transform coefficient block 312) are processed first. The adaptive selection of the scan order may be performed when inter prediction, intra block copy prediction, or other prediction methods are used. In one or more embodiments, the adaptive selection of the scan order may be performed only when inter or intra block copy prediction are used.

An indication of the 1D transform direction may be sent via the video bitstream 120 to inform a decoder (e.g., the video decoder 200) about the 1D transform direction and/or the scan order. The indication may be included at various locations of the bitstream 120 such as the video parameter set (VPS), sequence parameter set (SPS), picture parameter set (PPS), and/or the like. The video encoder 100 may use various mechanisms to implement the indication, including, for example, bit sequences, flags, and/or the like, all of which are within the scope of this disclosure.

The video decoder 200 may receive a video bitstream (e.g., such as the bitstream 202) containing the indication of the 1D transform direction. The video decoder 200 may be operable to extract the indication upon entropy decoding (e.g., via entropy decoding unit 204) the bitstream 202. Based on the 1D transform direction conveyed by the indication, the video decoder 200 may determine the scan order applied during the encoding process. For example, if the indicated 1D transform is in a horizontal direction, the video decoder 200 may infer that a scan order in an orthogonal direction (i.e., a vertical direction) was used by the video encoder 100. Likewise, if the indicated 1D transform is in a vertical direction, the video decoder 200 may infer a horizontal scan order (i.e., orthogonal to the 1D transform direction). The video decoder 200 may rely on the determined scan order to construct a transform coefficient block, and perform inverse 1D transform on the transform coefficient block. Further, the video decoder 200 may determine, based on one or more coding parameters included in the bitstream 204, the type of prediction method (e.g., inter prediction, intra block copy prediction, and the like) applied by the video encoder 100. Such information may allow the video decoder 200 to retrieve the relevant prediction blocks, for example.

Figure 10A:
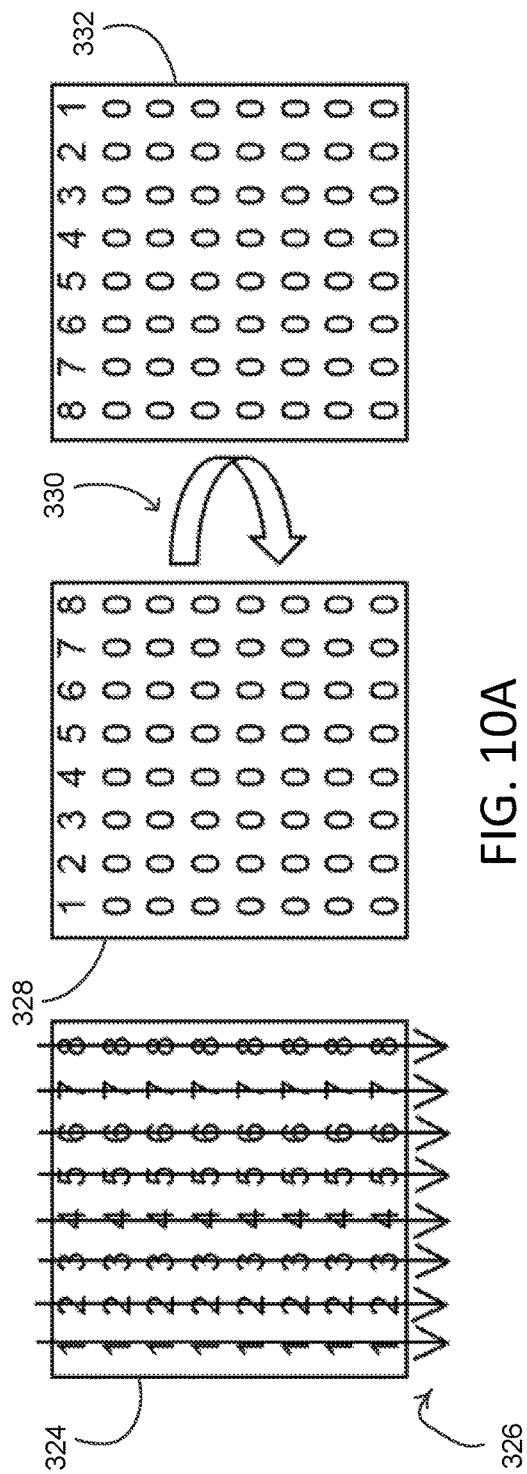
FIG. 10A illustrates an example horizontal flip of a transform coefficient block after an example 1D vertical transform.

In addition to or in lieu of the scan method described herein, the video encoder 100 may flip the transform coefficients in a transform coefficient block prior to scanning them. The video encoder 100 may determine whether to flip the transform coefficient block based on the directions of the prediction mode and 1D transform mode applied. For example, when intra prediction is performed in one of a horizontal or vertical directions, and 1D transform is performed in a direction orthogonal to the intra prediction direction (e.g., the other of the horizontal or vertical directions), the video encoder 100 may determine to flip the transform coefficient block in a direction orthogonal to the 1D transform direction. FIG. 10A illustrates an example flip in a horizontal direction. As shown, a residual block 324 may be generated from intra prediction in a horizontal direction. Because of the horizontal intra prediction, large prediction residual in the residual block 324 may appear more at positions farther away from the reference pixels (e.g., such as shown by the larger numbers on the right side of the residual block 324). The video encoder 100 may perform 1D transform on the residual block 324 in a direction (e.g., 1D vertical transform 326) orthogonal to the direction of the horizontal intra prediction. The 1D transform (and/or subsequent quantization) may produce a transform coefficient block 328 in which large transform coefficients may appear more in the direction for which transform is skipped (e.g., a horizontal direction). The positions of the large transform coefficients may also be farther away from the reference pixels (e.g., as shown by the larger numbers towards the right side of the top row). The video encoder 100 may decide in such situations to perform a "horizontal flip" 330 of the transform coefficient block 328 so that the larger coefficients may be swapped to positions that would be scanned first as shown in the horizontally "flipped" transform coefficient block 332). The effect of such a "horizontal flip" may be illustrated by the formula below:

$$\text{output}[x][y]=\text{input}[\text{width}-x][y]$$

In other words, through the "horizontal flip," the transform coefficients at horizontal positions width−x may be swapped to horizontal positions x while the vertical positions y of the coefficients remain the same.

Figure 10B:
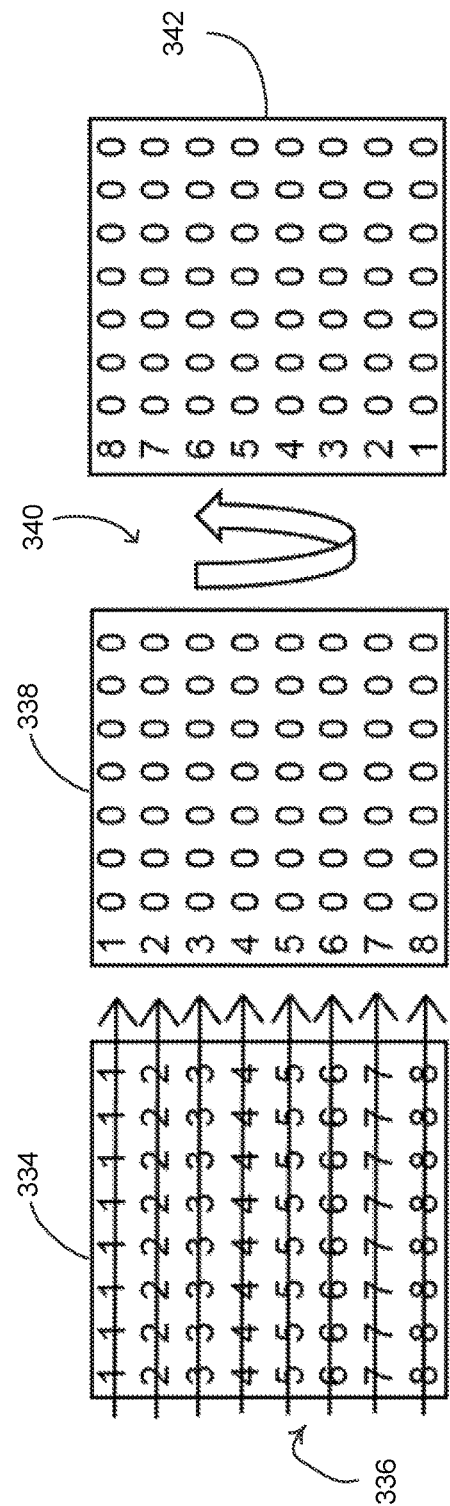
FIG. 10B illustrates an example vertical flip of a transform coefficient block after an example 1D horizontal transform.

FIG. 10B illustrates an example flip in a vertical direction. As shown, a residual block 334 may be derived from intra prediction in a vertical direction. As a result of the vertical intra prediction, large prediction residual in the residual block 334 may appear more at positions farther away from the reference pixels (e.g., such as shown by the larger numbers on the bottom section of the residual block 334). The video encoder 100 may perform 1D transform on the residual block 334 in a direction (e.g., 1D horizontal transform 336) orthogonal to the vertical intra prediction. The 1D transform (and/or subsequent quantization) may produce a transform coefficient block 338 in which large transform coefficients may appear more in the direction for which transform is skipped (e.g., a vertical direction). The positions of the large transform coefficients may also be farther away from the reference pixels (e.g., as shown by the larger numbers towards the bottom of the first column). The video encoder 100 may decide in such situations to perform a "vertical flip" 340 of the transform coefficient block 338 so that the larger coefficients may be swapped to positions that would be scanned first (e.g., as shown in the vertically "flipped" transform coefficient block 342). The effect of such a "vertical flip" may be illustrated by the formula below:

output[x][y]=input[x][height−y]

In other words, through the "vertical flip," the transform coefficients at vertical positions height−y may be swapped to vertical positions y while the horizontal positions x of the coefficients remain the same.

Figure 11A:
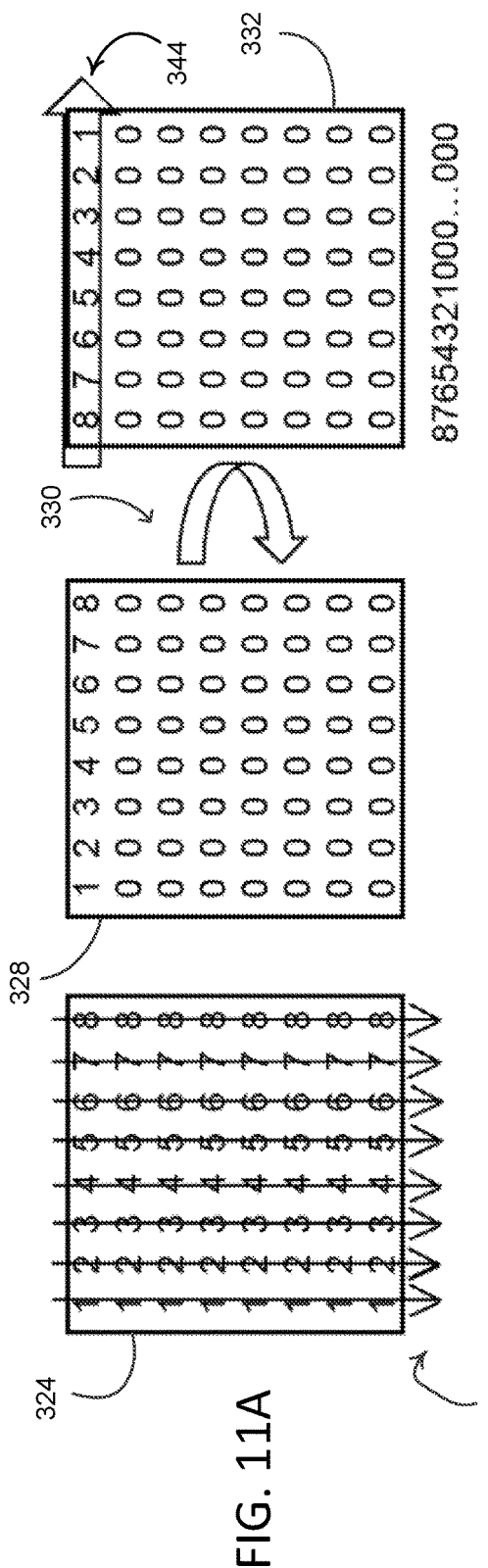
FIG. 11A illustrates an example horizontal flip followed by an example horizontal scan.
Figure 11B:
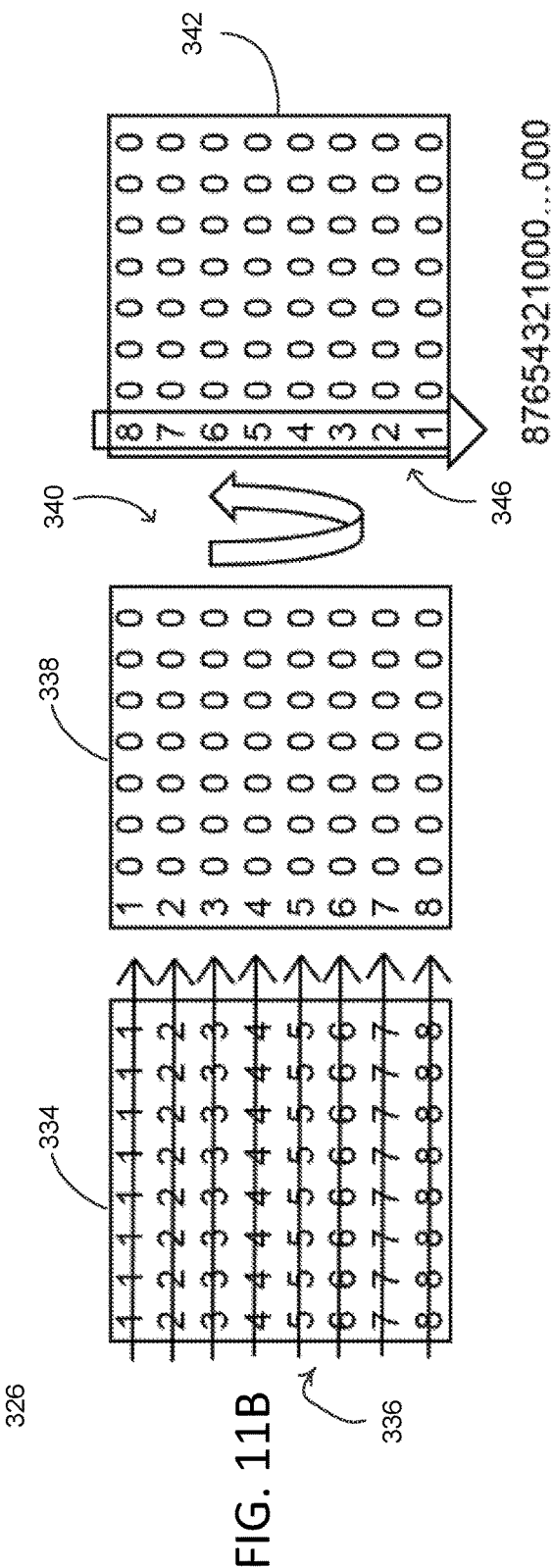
FIG. 11B illustrates an example vertical flip followed by an example vertical scan.

The transform coefficients exiting the flipping process may be scanned according to the methods described herein. For example, the video encoder 100 may scan the flipped transform coefficients in a direction orthogonal to the 1D transform direction. That is, if 1D horizontal transform is applied, the video encoder 100 may scan the transform coefficients in a vertical direction, as described herein and shown by the horizontal scan 344 in FIG. 11A. If 1D vertical transform is applied, the video encoder 100 may scan the transform coefficients in a horizontal direction, as described herein and shown by the vertical scan 346 in FIG. 11B. The video encoder 100 may apply other scanning methods including, for example, a diagonal scan.

Indications for the intra prediction and 1D transform directions may be sent via the video bitstream 120 to inform a decoder (e.g., the video decoder 200) about those directions. The video encoder 100 may add the indications to various locations in the bitstream 120. For example, the indications may be added to the video parameter set (VPS), sequence parameter set (SPS), picture parameter set (PPS), and/or the like. The video encoder 100 may use various mechanisms to implement the indications, including, for example, bit sequences, flags, and/or the like, all of which are within the scope of this disclosure.

The video decoder 200 may receive a video bitstream (e.g., such as the bitstream 202) containing the indications of the intra prediction and 1D transform directions. The video decoder 200 may be operable to extract the indications upon entropy decoding (e.g., via entropy decoding unit 204) the bitstream 202. The video decoder 200 may determine, based on the intra prediction direction and the 1D transform direction, whether flipping of the transform coefficients occurred during the encoding process and/or what type of flipping (e.g., a horizontal flip or a vertical flip) was applied. For example, the video decoder 200 may conclude that flipping occurred upon finding that the indicated intra prediction and 1D transform directions are orthogonal to each other (e.g., horizontal intra prediction and vertical 1D transform, or vice versa). The video decoder 200 may be operable to further identify the type of flipping that was applied based on the indicated intra prediction direction or 1D transform direction. For example, the video decoder 200 may conclude that a horizontal flip was applied if the indicated intra prediction direction is horizontal and the indicated 1D transform direction is vertical. Likewise, the video decoder 200 may conclude that a vertical flip was applied if the indicated intra prediction direction is vertical and the indicated 1D transform direction is horizontal. In other words, the logic executed by the video decoder 200 in determining the direction of the flipping may be that the flipping direction is orthogonal to the 1D transform direction (and thus the same as the intra prediction direction).

The video decoder 200 may process the transform coefficient block based on a determination of the "flipping" operation. For example, upon concluding that flipping occurred and identifying the direction of the flipping, the video decoder 200 may effect an inverse flip of the transform coefficients (e.g., swapping the coefficients at horizontal positions x and width−x for a horizontal flip and the coefficients at vertical positions y and height−y for a vertical flip). The video decoder 200 may then perform inverse 1D transform on the inverse-flipped transform coefficient block. If the video decoder 200 concludes that no flipping occurred during the encoding process, the video decoder 200 may proceed to perform inverse 1D transform without inverse-flipping the transform coefficient block.

Figure 12:
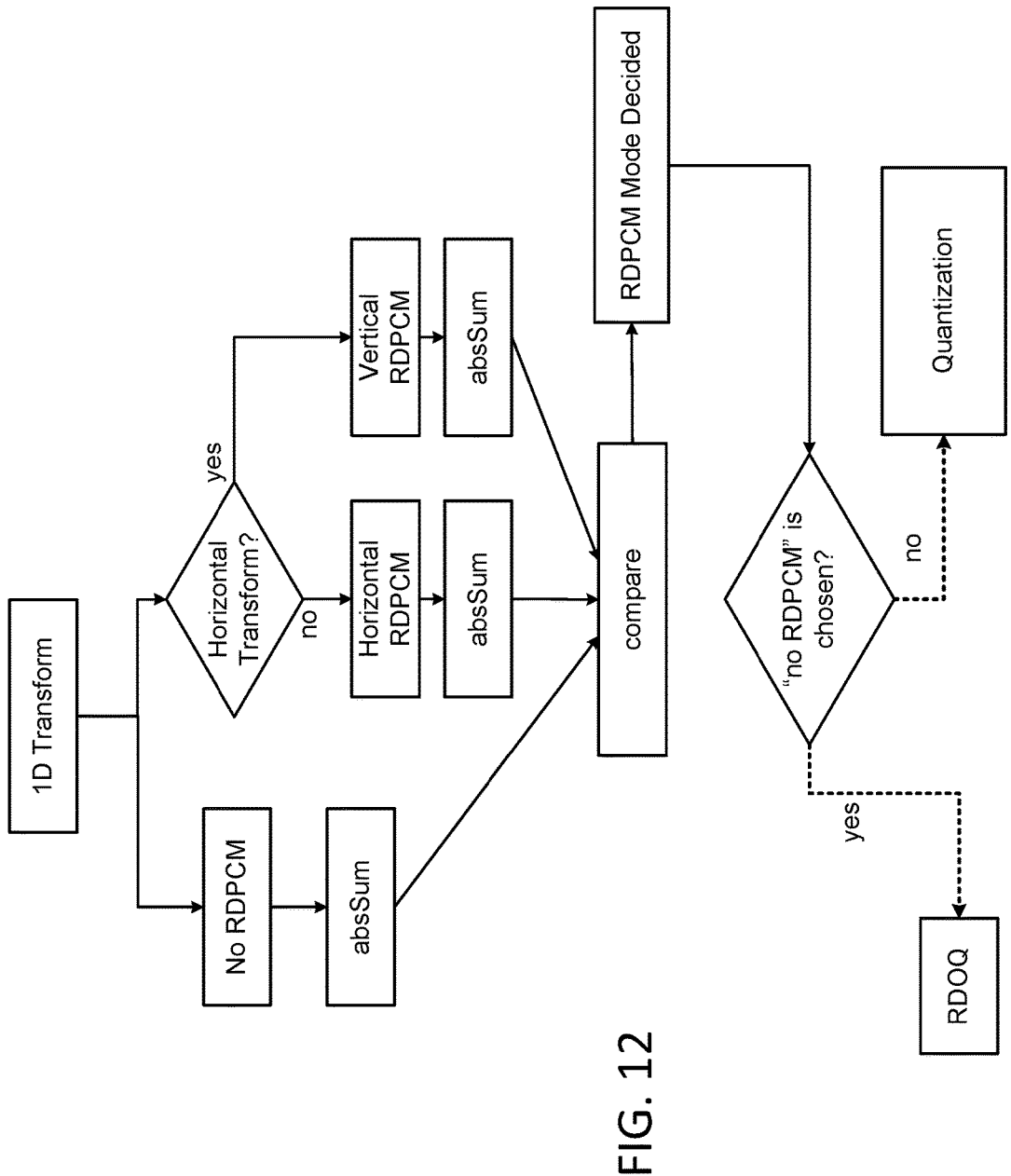
FIG. 12 depicts an example selection process for RDPCM.

When a 1D transform mode is applied for a residual block in one of a horizontal or vertical directions, the other of the vertical or horizontal directions may not go through a transform. Thus, the 1D transform coefficients in the transform-skipped direction may keep the characteristics of the residual. Accordingly, the video encoder 100 may decide to apply a Residual Differential Pulse Code Modulation (RDPCM) mode to the 1D transform coefficients. Various RDPCM modes may be selected including, for example, RDPCM_OFF (e.g., no RDPCM), RDPCM_HOR (e.g., applying RDPCM in the horizontal dimension) or RDPCM_VER (e.g., applying RDPCM in the horizontal dimension). Various selection algorithms are possible. For example, the video encoder 100 may estimate, for each candidate RDPCM mode, an absolute sum of quantized errors between the original coefficients (e.g., before they are quantized) and their quantized predictors, and select the RDPCM mode with the smallest absolute sum. FIG. 12 illustrates such an example selection algorithm. As shown, the absolute sum of quantized errors may be calculated as described herein for each of the candidate RDPCM modes (including the mode in which no RDPCM is to be applied). The results may be compared to identify the mode with the best outcome (e.g., smallest absolute sum). If the "no RDPCM" mode is selected through the process, the video encoder 100 may proceed to apply rate distortion optimization quantization (RDOQ) on the transform coefficients; otherwise, regular quantization may be applied. In one or more examples, the video encoder 100 may apply RDPCM only on the DC coefficients since those coefficients may acquire larger magnitudes after 1D transform. With respect to RDOQ for 1D transform modes, the video encoder 100 may apply an error scaling factor to the calculated error so as to, for example, compensate the scaling of 1D transform. In one or more examples, the scaling factor applied may be $2^{TransformShift}$, wherein TransformShift represents the introduced bit shift during the 1D transform.

The video encoder 100 may send an indication via the video bitstream 120 regarding the selected RDPCM mode. The video encoder 100 may send other indications and/or parameters to the bitstream 120 including, for example, a parameter for limiting the maximum transform unit (TU) block size for which 1D transform may be applied. The video encoder 100 may add the indications and/or parameters described herein to various locations of the bitstream 120. For example, the indications may be added to the video parameter set (VPS), sequence parameter set (SPS), picture parameter set (PPS), and/or the like. The video encoder 100 may utilize various mechanisms to implement the indications and/or parameters, including, for example, bit sequences, flags, and/or the like, all of which are within the scope of this disclosure.

The video decoder 200 may receive a video bitstream (e.g., such as the bitstream 202) containing the indication for the selected RDPCM mode and one or more other indications/parameters described herein. The video decoder 200 may be operable to extract the RDPCM indications and/or the other parameters upon entropy decoding (e.g., via entropy decoding unit 204) the bitstream 202. Based on the indicated RDPCM mode, the video decoder 200 may determine, for example, whether RDPCM was applied by the video encoder 100 and what type of RDPCM was applied. For example, upon examining the RDPCM indication, the video decoder 200 may conclude that no RDPMC was performed by the video encoder 100, and thereby no inverse RDPCM is necessary in the decoding process. Alternatively, the video decoder 200 may determine that a certain type of RDPCM (e.g., a horizontal RDPCM or a vertical RDPCM) was applied by the video encoder 100, upon which determination the video decoder 200 may proceed to perform inverse RDPCM based on the indicated RDPCM mode.

Figure 13A:
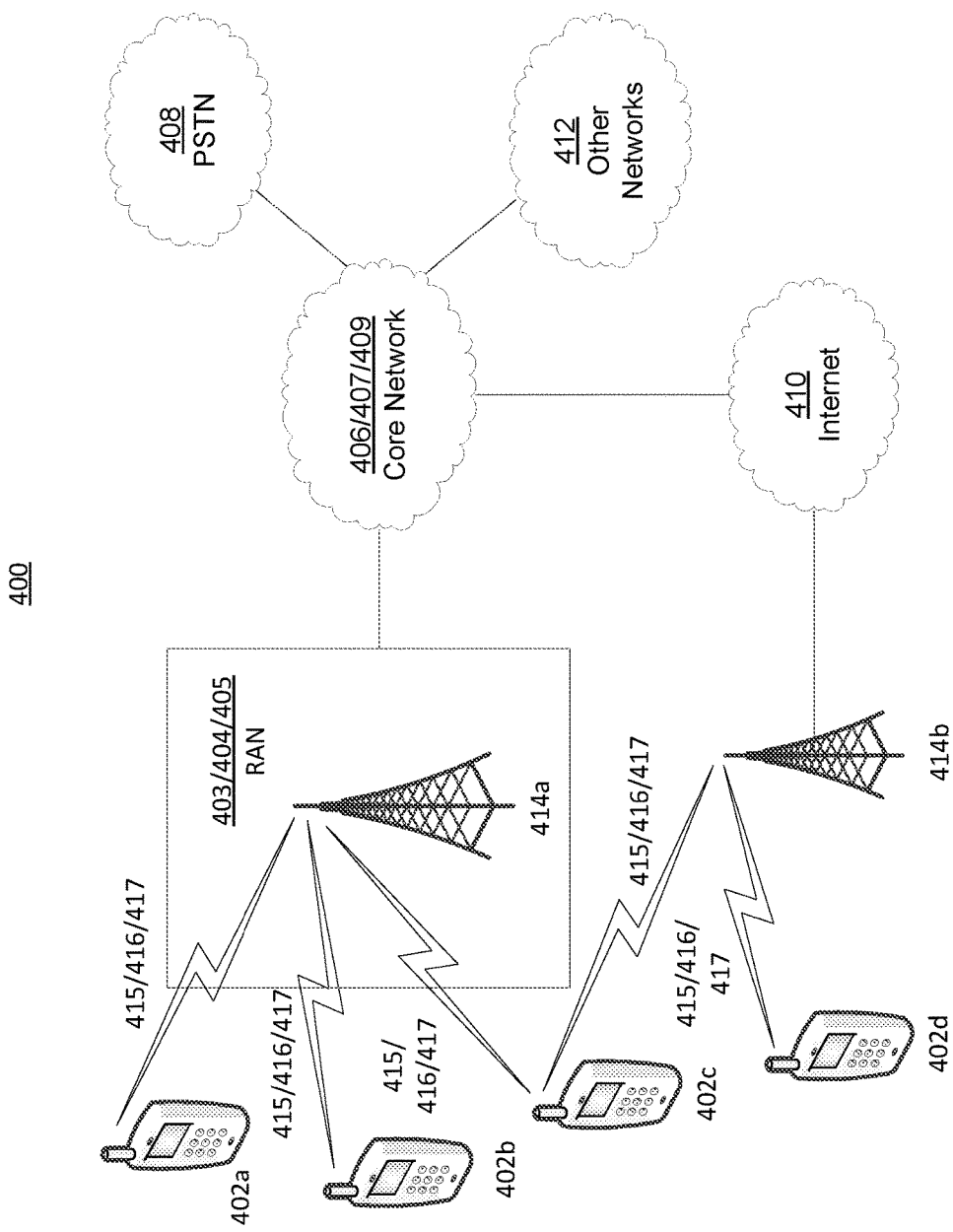
FIG. 13A depicts a diagram of an example communications system in which one or more disclosed embodiments may be implemented.

FIG. 13A is a diagram of an example communications system 400 in which one or more examples disclosed herein may be implemented. The communications system 400 may be a multiple access system that provides content, such as voice, data, video, messaging, broadcast, etc., to multiple wireless users. The communications system 400 may enable multiple wireless users to access such content through the sharing of system resources, including wireless bandwidth. For example, the communications systems 400 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 13A, the communications system 400 may include wireless transmit/receive units (WTRUs) 402a, 402b, 402c, and/or 402d (which generally or collectively may be referred to as WTRU 402), a radio access network (RAN) 403/404/405, a core network 406/407/409, a public switched telephone network (PSTN) 408, the Internet 410, and other networks 412, though it will be appreciated that the disclosed embodiments contemplate any number of WTRUs, base stations, networks, and/or network elements. Each of the WTRUs 402a, 402b, 402c, 402d may be any type of device configured to operate and/or communicate in a wireless environment. By way of example, the WTRUs 402a, 402b, 402c, 402d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 400 may also include a base station 414a and a base station 414b. Each of the base stations 414a, 414b may be any type of device configured to wirelessly interface with at least one of the WTRUs 402a, 402b, 402c, 402d to facilitate access to one or more communication networks, such as the core network 406/407/409, the Internet 410, and/or the networks 412. By way of example, the base stations 414a, 414b may be a base transceiver station (BTS), a Node-B, an eNode B, a Home Node B, a Home eNode B, a site controller, an access point (AP), a wireless router, and the like. While the base stations 414a, 414b are each depicted as a single element, it will be appreciated that the base stations 414a, 414b may include any number of interconnected base stations and/or network elements.

The base station 414a may be part of the RAN 403/404/405, which may also include other base stations and/or network elements (not shown), such as a base station controller (BSC), a radio network controller (RNC), relay nodes, etc. The base station 414a and/or the base station 414b may be configured to transmit and/or receive wireless signals within a particular geographic region, which may be referred to as a cell (not shown). The cell may further be divided into cell sectors. For example, the cell associated with the base station 414a may be divided into three sectors. Thus, in one embodiment, the base station 414a may include three transceivers, i.e., one for each sector of the cell. In another embodiment, the base station 414a may employ multiple-input multiple output (MIMO) technology and, therefore, may utilize multiple transceivers for each sector of the cell.

The base stations 414a, 414b may communicate with one or more of the WTRUs 402a, 402b, 402c, 402d over an air interface 415/416/417, which may be any suitable wireless communication link (e.g., radio frequency (RF), microwave, infrared (IR), ultraviolet (UV), visible light, etc.). The air interface 415/416/417 may be established using any suitable radio access technology (RAT).

More specifically, as noted above, the communications system 400 may be a multiple access system and may employ one or more channel access schemes, such as CDMA, TDMA, FDMA, OFDMA, SC-FDMA, and the like. For example, the base station 414a in the RAN 403/404/405 and the WTRUs 402a, 402b, 402c may implement a radio technology such as Universal Mobile Telecommunications System (UMTS) Terrestrial Radio Access (UTRA), which may establish the air interface 415/416/417 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 414a and the WTRUs 402a, 402b, 402c may implement a radio technology such as Evolved UMTS Terrestrial Radio Access (E-UTRA), which may establish the air interface 415/416/417 using Long Term Evolution (LTE) and/or LTE-Advanced (LTE-A).

In other embodiments, the base station 414a and the WTRUs 402a, 402b, 402c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 414b in FIG. 13A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 414b and the WTRUs 402c, 402d may implement a radio technology such as IEEE 802.11 to establish a wireless local area network (WLAN). In another embodiment, the base station 414b and the WTRUs 402c, 402d may implement a radio technology such as IEEE 802.15 to establish a wireless personal area network (WPAN). In yet another embodiment, the base station 414b and the WTRUs 402c, 402d may utilize a cellular-based RAT (e.g., WCDMA, CDMA2000, GSM, LTE, LTE-A, etc.) to establish a picocell or femtocell. As shown in FIG. 13A, the base station 414b may have a direct connection to the Internet 410. Thus, the base station 414b may not be required to access the Internet 410 via the core network 406/407/409.

The RAN 403/404/405 may be in communication with the core network 406/407/409, which may be any type of network configured to provide voice, data, applications, and/or voice over internet protocol (VoIP) services to one or more of the WTRUs 402a, 402b, 402c, 402d. For example, the core network 406/407/409 may provide call control, billing services, mobile location-based services, pre-paid calling, Internet connectivity, video distribution, etc., and/or perform high-level security functions, such as user authentication. Although not shown in FIG. 13A, it will be appreciated that the RAN 403/404/405 and/or the core network 406/407/409 may be in direct or indirect communication with other RANs that employ the same RAT as the RAN 403/404/405 or a different RAT. For example, in addition to being connected to the RAN 403/404/405, which may be utilizing an E-UTRA radio technology, the core network 406/407/409 may also be in communication with another RAN (not shown) employing a GSM radio technology.

The core network 406/407/409 may also serve as a gateway for the WTRUs 402a, 402b, 402c, 402d to access the PSTN 408, the Internet 410, and/or other networks 412. The PSTN 408 may include circuit-switched telephone networks that provide plain old telephone service (POTS). The Internet 410 may include a global system of interconnected computer networks and devices that use common communication protocols, such as the transmission control protocol (TCP), user datagram protocol (UDP) and the internet protocol (IP) in the TCP/IP internet protocol suite. The networks 412 may include wired or wireless communications networks owned and/or operated by other service providers. For example, the networks 412 may include another core network connected to one or more RANs, which may employ the same RAT as the RAN 403/404/405 or a different RAT.

Some or all of the WTRUs 402a, 402b, 402c, 402d in the communications system 400 may include multi-mode capabilities, i.e., the WTRUs 402a, 402b, 402c, 402d may include multiple transceivers for communicating with different wireless networks over different wireless links. For example, the WTRU 402c shown in FIG. 13A may be configured to communicate with the base station 414a, which may employ a cellular-based radio technology, and with the base station 414b, which may employ an IEEE 802 radio technology.

Figure 13B:
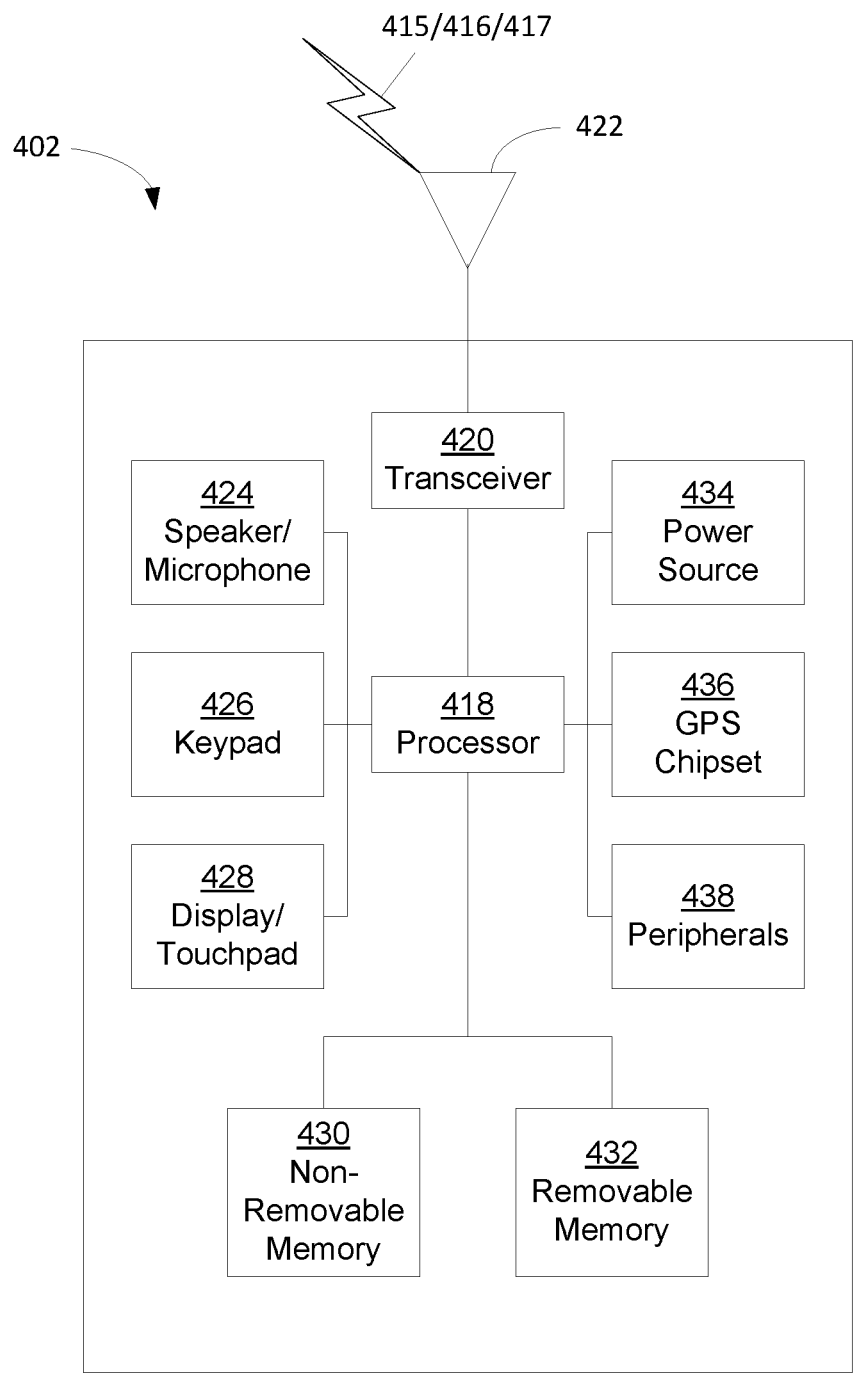
FIG. 13B depicts a system diagram of an example wireless transmit/receive unit (WTRU) that may be used within the communications system illustrated in FIG. 13A.

FIG. 13B is a system diagram of an example WTRU 402. As shown in FIG. 13B, the WTRU 402 may include a processor 418, a transceiver 420, a transmit/receive element 422, a speaker/microphone 424, a keypad 426, a display/touchpad 428, non-removable memory 430, removable memory 432, a power source 434, a global positioning system (GPS) chipset 436, and other peripherals 438. It will be appreciated that the WTRU 402 may include any sub-combination of the foregoing elements while remaining consistent with an embodiment. Also, embodiments contemplate that the base stations 414a and 414b, and/or the nodes that base stations 414a and 414b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 13B and described herein.

The processor 418 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 418 may perform signal coding, data processing, power control, input/output processing, and/or any other functionality that enables the WTRU 402 to operate in a wireless environment. The processor 418 may be coupled to the transceiver 420, which may be coupled to the transmit/receive element 422. While FIG. 13B depicts the processor 418 and the transceiver 420 as separate components, it will be appreciated that the processor 418 and the transceiver 420 may be integrated together in an electronic package or chip.

The transmit/receive element 412 may be configured to transmit signals to, or receive signals from, a base station (e.g., the base station 414a) over the air interface 415/416/417. For example, in one embodiment, the transmit/receive element 412 may be an antenna configured to transmit and/or receive RF signals. In another embodiment, the transmit/receive element 422 may be an emitter/detector configured to transmit and/or receive IR, UV, or visible light signals, for example. In yet another embodiment, the transmit/receive element 422 may be configured to transmit and receive both RF and light signals. It will be appreciated that the transmit/receive element 422 may be configured to transmit and/or receive any combination of wireless signals.

In addition, although the transmit/receive element 422 is depicted in FIG. 13B as a single element, the WTRU 402 may include any number of transmit/receive elements 422. More specifically, the WTRU 402 may employ MIMO technology. Thus, in one embodiment, the WTRU 402 may include two or more transmit/receive elements 422 (e.g., multiple antennas) for transmitting and receiving wireless signals over the air interface 415/416/417.

The transceiver 420 may be configured to modulate the signals that are to be transmitted by the transmit/receive element 422 and to demodulate the signals that are received by the transmit/receive element 422. As noted above, the WTRU 402 may have multi-mode capabilities. Thus, the transceiver 420 may include multiple transceivers for enabling the WTRU 402 to communicate via multiple RATs, such as UTRA and IEEE 802.11, for example.

The processor 418 of the WTRU 402 may be coupled to, and may receive user input data from, the speaker/microphone 424, the keypad 426, and/or the display/touchpad 428 (e.g., a liquid crystal display (LCD) display unit or organic light-emitting diode (OLED) display unit). The processor 418 may also output user data to the speaker/microphone 124, the keypad 426, and/or the display/touchpad 428. In addition, the processor 418 may access information from, and store data in, any type of suitable memory, such as the non-removable memory 430 and/or the removable memory 432. The non-removable memory 430 may include random-access memory (RAM), read-only memory (ROM), a hard disk, or any other type of memory storage device. The removable memory 432 may include a subscriber identity unit (SIM) card, a memory stick, a secure digital (SD) memory card, and the like. In other embodiments, the processor 418 may access information from, and store data in, memory that is not physically located on the WTRU 402, such as on a server or a home computer (not shown).

The processor 418 may receive power from the power source 434, and may be configured to distribute and/or control the power to the other components in the WTRU 402. The power source 434 may be any suitable device for powering the WTRU 402. For example, the power source 434 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 418 may also be coupled to the GPS chipset 436, which may be configured to provide location information (e.g., longitude and latitude) regarding the current location of the WTRU 402. In addition to, or in lieu of, the information from the GPS chipset 436, the WTRU 402 may receive location information over the air interface 415/416/417 from a base station (e.g., base stations 414a, 414b) and/or determine its location based on the timing of the signals being received from two or more nearby base stations. It will be appreciated that the WTRU 402 may acquire location information by way of any suitable location-determination method while remaining consistent with an embodiment.

The processor 418 may further be coupled to other peripherals 438, which may include one or more software and/or hardware units that provide additional features, functionality and/or wired or wireless connectivity. For example, the peripherals 438 may include an accelerometer, an e-compass, a satellite transceiver, a digital camera (for photographs or video), a universal serial bus (USB) port, a vibration device, a television transceiver, a hands free headset, a Bluetooth® unit, a frequency modulated (FM) radio unit, a digital music player, a media player, a video game player unit, an Internet browser, and the like.

Figure 13C:
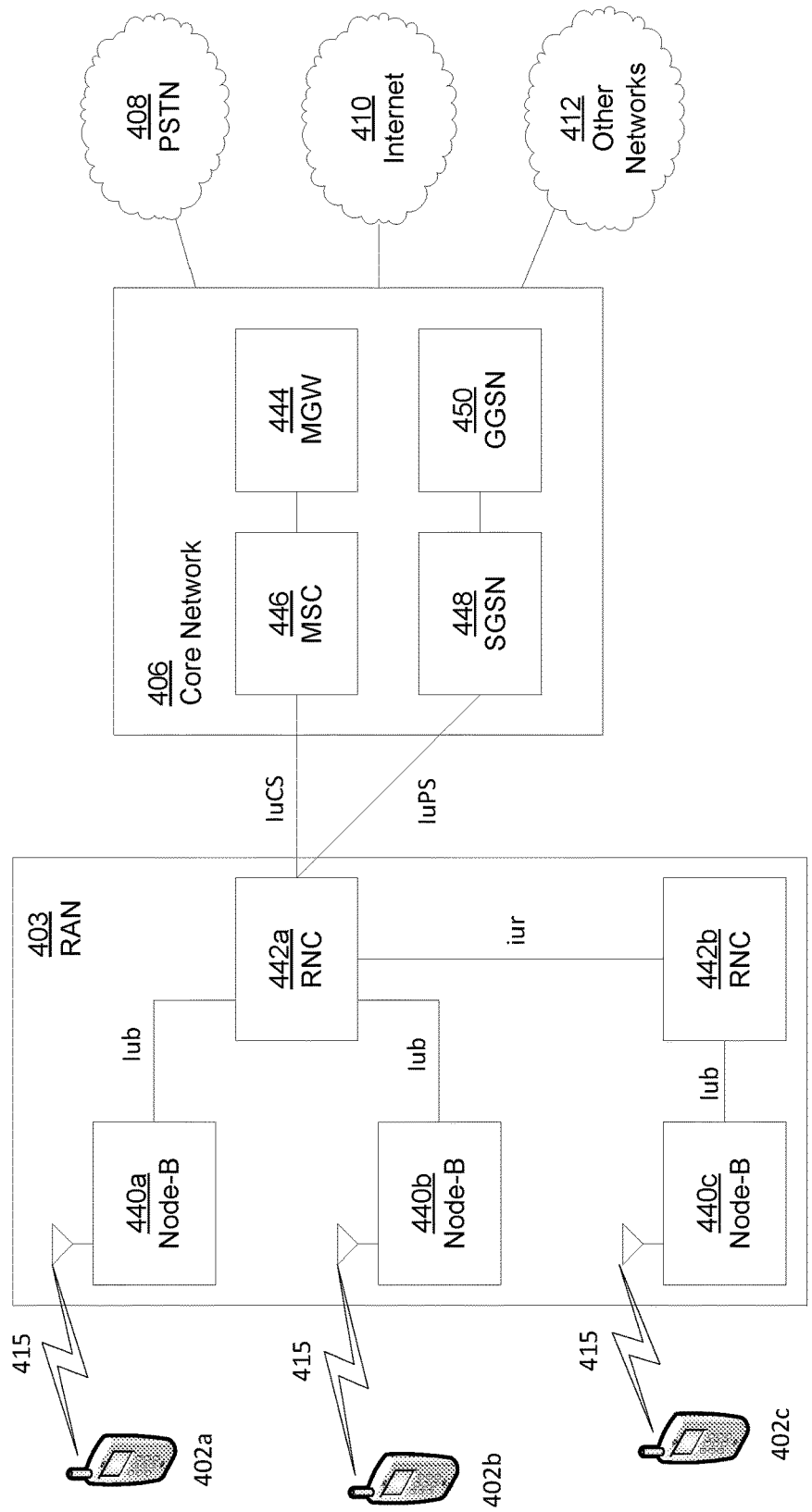
FIG. 13C depicts a system diagram of an example radio access network and an example core network that may be used within the communications system illustrated in FIG. 13A.

FIG. 13C is a system diagram of the RAN 403 and the core network 406 according to an embodiment. As noted above, the RAN 403 may employ a UTRA radio technology to communicate with the WTRUs 402a, 402b, 402c over the air interface 415. The RAN 403 may also be in communication with the core network 406. As shown in FIG. 13C, the RAN 403 may include Node-Bs 440a, 440b, 440c, which may each include one or more transceivers for communicating with the WTRUs 402a, 402b, 402c over the air interface 415. The Node-Bs 440a, 440b, 440c may each be associated with a particular cell (not shown) within the RAN 403. The RAN 403 may also include RNCs 442a, 442b. It will be appreciated that the RAN 403 may include any number of Node-Bs and RNCs while remaining consistent with an embodiment.

As shown in FIG. 13C, the Node-Bs 440a, 440b may be in communication with the RNC 442a. Additionally, the Node-B 440c may be in communication with the RNC 442b. The Node-Bs 440a, 440b, 440c may communicate with the respective RNCs 442a, 442b via an Iub interface. The RNCs 442a, 442b may be in communication with one another via an Iur interface. Each of the RNCs 442a, 442b may be configured to control the respective Node-Bs 440a, 440b, 440c to which it is connected. In addition, each of the RNCs 442a, 442b may be configured to carry out or support other functionality, such as outer loop power control, load control, admission control, packet scheduling, handover control, macrodiversity, security functions, data encryption, and the like.

The core network 406 shown in FIG. 13C may include a media gateway (MGW) 444, a mobile switching center (MSC) 446, a serving GPRS support node (SGSN) 448, and/or a gateway GPRS support node (GGSN) 450. While each of the foregoing elements are depicted as part of the core network 406, it will be appreciated that any one of these elements may be owned and/or operated by an entity other than the core network operator.

The RNC 442a in the RAN 403 may be connected to the MSC 446 in the core network 406 via an IuCS interface. The MSC 446 may be connected to the MGW 444. The MSC 446 and the MOW 444 may provide the WTRUs 402a, 402b, 402c with access to circuit-switched networks, such as the PSTN 408, to facilitate communications between the WTRUs 402a, 402b, 402c and traditional land-line communications devices.

The RNC 442a in the RAN 403 may also be connected to the SGSN 448 in the core network 406 via an IuPS interface. The SGSN 448 may be connected to the GGSN 450. The SGSN 448 and the GGSN 450 may provide the WTRUs 402a, 402b, 402c with access to packet-switched networks, such as the Internet 410, to facilitate communications between and the WTRUs 402a, 402b, 402c and IP-enabled devices.

As noted above, the core network 406 may also be connected to the networks 412, which may include other wired or wireless networks that are owned and/or operated by other service providers.

Figure 13D:
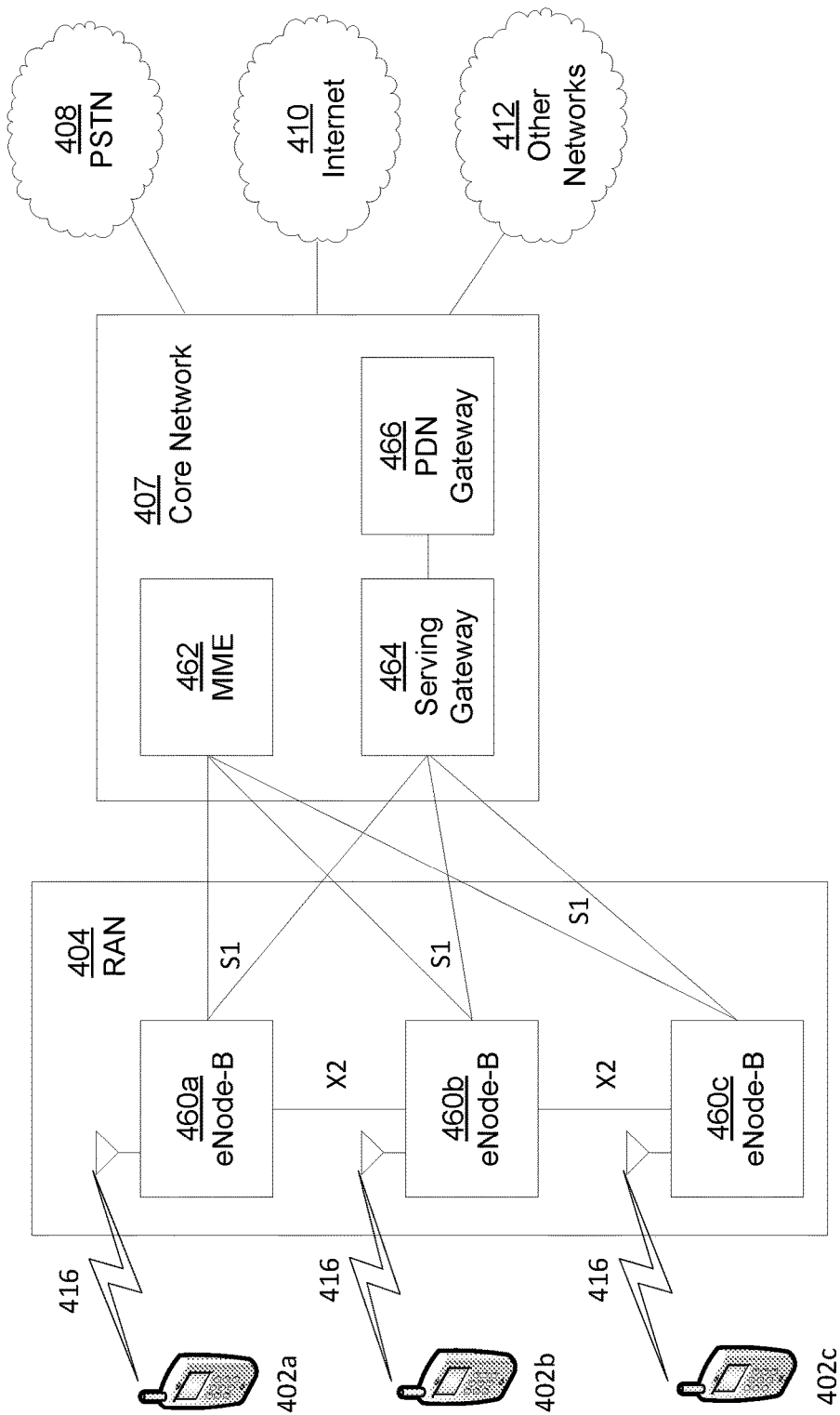
FIG. 13D depicts a system diagram of another example radio access network and an example core network that may be used within the communications system illustrated in FIG. 13A.

FIG. 13D is a system diagram of the RAN 404 and the core network 407 according to an embodiment. As noted above, the RAN 404 may employ an E-UTRA radio technology to communicate with the WTRUs 402a, 402b, 402c over the air interface 416. The RAN 404 may also be in communication with the core network 407.

The RAN 404 may include eNode-Bs 460a, 460b, 460c, though it will be appreciated that the RAN 404 may include any number of eNode-Bs while remaining consistent with an embodiment. The eNode-Bs 460a, 460b, 460c may each include one or more transceivers for communicating with the WTRUs 402a, 402b, 402c over the air interface 416. In one embodiment, the eNode-Bs 460a, 460b, 460c may implement MIMO technology. Thus, the eNode-B 460a, for example, may use multiple antennas to transmit wireless signals to, and receive wireless signals from, the WTRU 402a.

Each of the eNode-Bs 460a, 460b, 460c may be associated with a particular cell (not shown) and may be configured to handle radio resource management decisions, handover decisions, scheduling of users in the uplink and/or downlink, and the like. As shown in FIG. 13D, the eNode-Bs 460a, 460b, 460c may communicate with one another over an X2 interface.

The core network 407 shown in FIG. 13D may include a mobility management gateway (MME) 462, a serving gateway 464, and a packet data network (PDN) gateway 466. While each of the foregoing elements are depicted as part of the core network 407, it will be appreciated that any one of these elements may be owned and/or operated by an entity other than the core network operator.

The MME 462 may be connected to each of the eNode-Bs 460a, 460b, 460c in the RAN 404 via an S1 interface and may serve as a control node. For example, the MME 462 may be responsible for authenticating users of the WTRUs 402a, 402b, 402c, bearer activation/deactivation, selecting a particular serving gateway during an initial attach of the WTRUs 402a, 402b, 402c, and the like. The MME 462 may also provide a control plane function for switching between the RAN 404 and other RANs (not shown) that employ other radio technologies, such as GSM or WCDMA.

The serving gateway 464 may be connected to each of the eNode-Bs 460a, 460b, 460c in the RAN 404 via the S1 interface. The serving gateway 464 may generally route and forward user data packets to/from the WTRUs 402a, 402b, 402c. The serving gateway 464 may also perform other functions, such as anchoring user planes during inter-eNode B handovers, triggering paging when downlink data is available for the WTRUs 402a, 402b, 402c, managing and storing contexts of the WTRUs 402a, 402b, 402c, and the like.

The serving gateway 464 may also be connected to the PDN gateway 466, which may provide the WTRUs 402a, 402b, 402c with access to packet-switched networks, such as the Internet 410, to facilitate communications between the WTRUs 402a, 402b, 402c and IP-enabled devices.

The core network 407 may facilitate communications with other networks. For example, the core network 407 may provide the WTRUs 402a, 402b, 402c with access to circuit-switched networks, such as the PSTN 408, to facilitate communications between the WTRUs 402a, 402b, 402c and traditional land-line communications devices. For example, the core network 407 may include, or may communicate with, an IP gateway (e.g., an IP multimedia subsystem (IMS) server) that serves as an interface between the core network 407 and the PSTN 408. In addition, the core network 407 may provide the WTRUs 402a, 402b, 402c with access to the networks 412, which may include other wired or wireless networks that are owned and/or operated by other service providers.

Figure 13E:
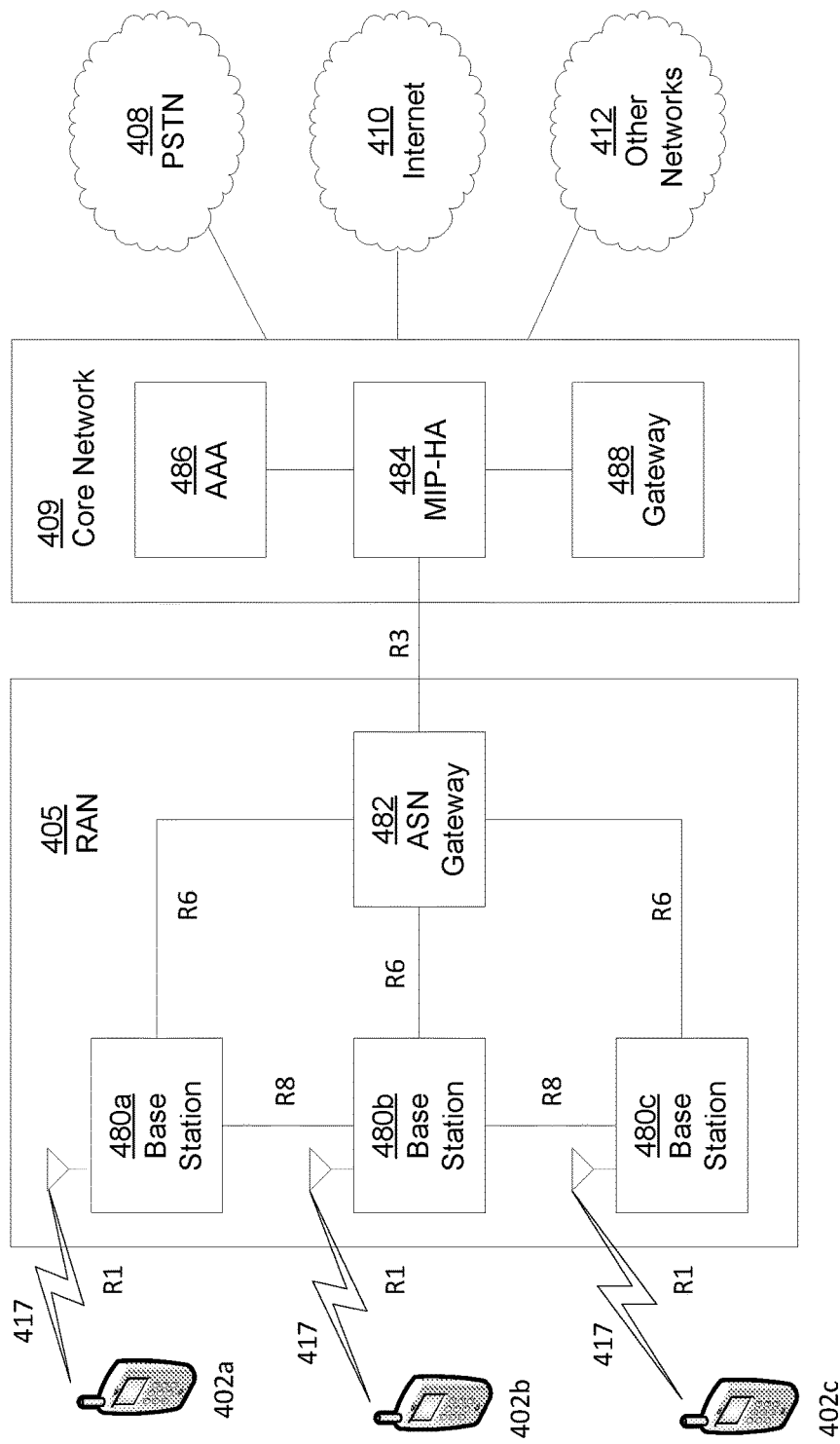
FIG. 13E depicts a system diagram of another example radio access network and an example core network that may be used within the communications system illustrated in FIG. 13A.

FIG. 13E is a system diagram of the RAN 405 and the core network 409 according to an embodiment. The RAN 405 may be an access service network (ASN) that employs IEEE 802.16 radio technology to communicate with the WTRUs 402a, 402b, 402c over the air interface 417. As will be further discussed below, the communication links between the different functional entities of the WTRUs 402a, 402b, 402c, the RAN 405, and the core network 409 may be defined as reference points.

As shown in FIG. 13E, the RAN 405 may include base stations 480a, 480b, 480c, and an ASN gateway 482, though it will be appreciated that the RAN 405 may include any number of base stations and ASN gateways while remaining consistent with an embodiment. The base stations 480a, 480b, 480c may each be associated with a particular cell (not shown) in the RAN 405 and may each include one or more transceivers for communicating with the WTRUs 402a, 402b, 402c over the air interface 417. In one embodiment, the base stations 480a, 480b, 480c may implement MIMO technology. Thus, the base station 480a, for example, may use multiple antennas to transmit wireless signals to, and receive wireless signals from, the WTRU 402a. The base stations 480a, 480b, 480c may also provide mobility management functions, such as handoff triggering, tunnel establishment, radio resource management, traffic classification, quality of service (QoS) policy enforcement, and the like. The ASN gateway 482 may serve as a traffic aggregation point and may be responsible for paging, caching of subscriber profiles, routing to the core network 409, and the like.

The air interface 417 between the WTRUs 402a, 402b, 402c and the RAN 405 may be defined as an R1 reference point that implements the IEEE 802.16 specification. In addition, each of the WTRUs 402a, 402b, 402c may establish a logical interface (not shown) with the core network 409. The logical interface between the WTRUs 402a, 402b, 402c and the core network 409 may be defined as an R2 reference point, which may be used for authentication, authorization, IP host configuration management, and/or mobility management.

The communication link between each of the base stations 480a, 480b, 480c may be defined as an R8 reference point that includes protocols for facilitating WTRU handovers and the transfer of data between base stations. The communication link between the base stations 480a, 480b, 480c and the ASN gateway 482 may be defined as an R6 reference point. The R6 reference point may include protocols for facilitating mobility management based on mobility events associated with each of the WTRUs 402a, 402b, 402c.

As shown in FIG. 13E, the RAN 405 may be connected to the core network 409. The communication link between the RAN 405 and the core network 409 may defined as an R3 reference point that includes protocols for facilitating data transfer and mobility management capabilities, for example. The core network 409 may include a mobile IP home agent (MIP-HA) 484, an authentication, authorization, accounting (AAA) server 486, and a gateway 488. While each of the foregoing elements are depicted as part of the core network 409, it will be appreciated that any one of these elements may be owned and/or operated by an entity other than the core network operator.

The MIP-HA may be responsible for IP address management, and may enable the WTRUs 402a, 402b, 402c to roam between different ASNs and/or different core networks. The MIP-HA 484 may provide the WTRUs 402a, 402b, 402c with access to packet-switched networks, such as the Internet 410, to facilitate communications between the WTRUs 402a, 402b, 402c and IP-enabled devices. The AAA server 486 may be responsible for user authentication and for supporting user services. The gateway 488 may facilitate interworking with other networks. For example, the gateway 488 may provide the WTRUs 402a, 402b, 402c with access to circuit-switched networks, such as the PSTN 408, to facilitate communications between the WTRUs 402a, 402b, 402c and traditional land-line communications devices. In addition, the gateway 488 may provide the WTRUs 402a, 402b, 402c with access to the networks 412, which may include other wired or wireless networks that are owned and/or operated by other service providers.

Although not shown in FIG. 13E, it will be appreciated that the RAN 405 may be connected to other ASNs and the core network 409 may be connected to other core networks. The communication link between the RAN 405 the other ASNs may be defined as an R4 reference point, which may include protocols for coordinating the mobility of the WTRUs 402a, 402b, 402c between the RAN 405 and the other ASNs. The communication link between the core network 409 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for video coding, the method comprising:
   receiving a video bitstream that comprises an indication of an intra prediction direction and an indication of a one-dimensional (1D) transform direction;
   determining whether to flip a transform coefficient block based on the intra prediction direction and the 1D transform direction;
   processing the transform coefficient block based on the determining, wherein based on a determination to flip the transform coefficients block, the transform coefficient block is flipped in a direction orthogonal to the 1D transform direction; and
   performing inverse 1D transform on the processed transform coefficient block.

2. The method of claim 1, wherein the determining of whether to flip the transform coefficient block is to flip the transform coefficient block when the intra prediction direction is orthogonal to the 1D transform direction.

3. The method of claim 1, wherein the 1D transform direction is horizontal or vertical.

4. The method of claim 3, wherein, when the 1D transform direction is horizontal, flipping the transform coefficients block in a direction orthogonal to the 1D transform direction comprises moving one or more transform coefficients of the transform coefficients block from their respective current positions to positions that are vertically symmetric to the current positions, and wherein, when the 1D transform direction is vertical, flipping the transform coefficients block in a direction orthogonal to the 1D transform direction comprises moving one or more transform coefficients of the transform coefficients block from their respective current positions to positions that are horizontally symmetric to the current positions.

5. The method of claim 1, further comprising:
   determining a scan order based on the 1D transform direction; and
   constructing the transform coefficients block based on the scan order.

6. The method of claim 5, wherein the scan order is determined to be in a direction orthogonal to the 1D transform direction.

7. The method of claim 5, wherein the scan order is used to construct the transform coefficient block only for inter prediction and intra block copy prediction.

8. A video coding device comprising:
   a processor configured to:
      receive a video bitstream that comprises an indication of an intra prediction direction and an indication of a one-dimensional (1D) transform direction;
      determine whether to flip a transform coefficient block based on the intra prediction direction and the 1D transform direction;
      process the transform coefficient block based on the determining, wherein based on a determination to flip the transform coefficient block, the processor is configured to flip the transform coefficient block in a direction orthogonal to the 1D transform direction; and
      perform inverse 1D transform on the processed transform coefficient block.

9. The video coding device of claim 8, wherein the processor is configured to determine to flip the transform coefficient block when the intra prediction direction is orthogonal to the 1D transform direction.

10. The video coding device of claim 8, wherein the 1D transform direction is horizontal or vertical.

11. The video coding device of claim 10, wherein, when the 1D transform direction is horizontal, the processor being configured to flip the transform coefficients block in a direction orthogonal to the 1D transform direction comprises the processor being configured to move one or more transform coefficients of the transform coefficients block from their respective current positions to positions that are vertically symmetric to the current positions, and wherein, when the 1D transform direction is vertical, the processor being configured to flip the transform coefficients block in a direction orthogonal to the 1D transform direction comprises the processor being configured to moving one or more transform coefficients of the transform coefficients block from their respective current positions to positions that are horizontally symmetric to the current positions.

12. The video coding device of claim 8, wherein the processor is further configured to:
   determine a scan order based on the 1D transform direction; and
   construct the transform coefficients block based on the scan order.

13. The video coding device of claim 12, wherein the scan order is determined to be in a direction orthogonal to the 1D transform direction.

14. The video coding device of claim 12, wherein the scan order is used to construct the transform coefficient block only for inter prediction and intra block copy prediction.

15. A method for video coding, the method comprising:
   receiving a video bitstream that comprises an indication of a one-dimensional (1D) transform direction and an indication of a prediction type;
   determining that the prediction type is inter prediction or intra block copy prediction;
   selecting a scan order that is orthogonal to the 1D transform direction indicated in the video bitstream;
   constructing a transform coefficients block based on the selected scan order; and
   performing inverse 1D transform on the transform coefficient block.

16. A video coding device comprising:
   a processor configured to:
   receive a video bitstream that comprises an indication of a one-dimensional (1D) transform direction and an indication of a prediction type;
   determine that the prediction type is inter prediction or intra block copy prediction;
   select a scan order that is orthogonal to the 1D transform direction indicated in the video bitstream;
   construct a transform coefficients block based on the selected scan order; and
   perform inverse 1D transform on the transform coefficient block.

* * * * *